(12) United States Patent
Chiu

(10) Patent No.: US 9,696,813 B2
(45) Date of Patent: Jul. 4, 2017

(54) GESTURE INTERFACE ROBOT

(71) Applicant: Hsien-Hsiang Chiu, Branchton (CA)

(72) Inventor: Hsien-Hsiang Chiu, Branchton (CA)

( * ) Notice: Subject to any disclaimer, the term of this patent is extended or adjusted under 35 U.S.C. 154(b) by 146 days.

(21) Appl. No.: 14/723,435

(22) Filed: May 27, 2015

(65) Prior Publication Data

US 2016/0350589 A1    Dec. 1, 2016

(51) Int. Cl.
| | |
|---|---|
| *G06F 3/01* | (2006.01) |
| *B25J 13/00* | (2006.01) |
| *G06K 9/00* | (2006.01) |
| *B25J 5/00* | (2006.01) |

(52) U.S. Cl.
CPC ............ *G06F 3/017* (2013.01); *B25J 5/007* (2013.01); *B25J 13/00* (2013.01); *G06K 9/00355* (2013.01); *Y10S 901/01* (2013.01); *Y10S 901/09* (2013.01)

(58) Field of Classification Search
CPC .......... G06K 9/00335; G06K 9/00355; G06K 9/00375; G06K 9/00342; G06F 3/017; G06F 3/0425; G06F 3/0426; B25J 13/006; B25J 5/007; Y10S 901/01; Y10S 901/09; Y10S 901/06
See application file for complete search history.

(56) References Cited

U.S. PATENT DOCUMENTS

| | | | | |
|---|---|---|---|---|
| 6,498,628 B2* | 12/2002 | Iwamura | ................. | G08C 23/00 345/157 |
| 7,340,077 B2* | 3/2008 | Gokturk | .................. | G06F 3/017 348/208.14 |
| 7,911,447 B2* | 3/2011 | Kouno | ..................... | A63F 13/00 345/156 |
| 8,552,983 B2* | 10/2013 | Chiu | ....................... | G06F 3/017 345/166 |
| 8,712,245 B1* | 4/2014 | Alao | ....................... | G08C 23/04 398/106 |
| 8,971,572 B1* | 3/2015 | Yin | ..................... | G06K 9/00355 345/173 |
| 9,342,146 B2* | 5/2016 | Bychkov | ................. | G06F 3/017 |
| 2006/0070558 A1* | 4/2006 | Chiu | ................... | B60R 25/1004 109/2 |

(Continued)

*Primary Examiner* — John Villecco
(74) *Attorney, Agent, or Firm* — Chen-Chi Li

(57) ABSTRACT

A gesture interface robot (GIR) automatically measures a work zone to establish virtual puzzle cells located in a user gesture comfortable area. The GIR allows the user to easily move hands to press selected virtual keys so as to prevent injury. The GIR draws virtual keyboard images that display commands on virtual puzzle cells. The GIR uses video vision sensing to detect user's hand location on the virtual keyboard images. Special unique gesture hand sings are designed for enhancing hand control virtual key selections. A push-hand-z-dimensional distant is divided into 3 selectable zones. A real-time display highlights a selected key graphic image to be visually seen by the user. Using a UIRT cable to send IR signal to a remote control computer. The GIR instantly generates a virtual puzzle cell keyboard or controller that the user selected. The GIR introduces a new gesture interface method, a touch screen mouse combined with puzzle cell virtual keys in sandwich layers gesture zones and a method for operating computer keys and mouse operations.

88 Claims, 14 Drawing Sheets

(56) References Cited

U.S. PATENT DOCUMENTS

| | | | |
|---|---|---|---|
| 2007/0192910 A1* | 8/2007 | Vu | B25J 5/007 700/245 |
| 2007/0283296 A1* | 12/2007 | Nilsson | G06F 3/017 715/863 |
| 2008/0005703 A1* | 1/2008 | Radivojevic | G06F 1/1626 715/863 |
| 2008/0013793 A1* | 1/2008 | Hillis | G03H 1/0005 382/114 |
| 2010/0103106 A1* | 4/2010 | Chui | G06F 3/017 345/166 |
| 2010/0295782 A1* | 11/2010 | Binder | G01S 3/7864 345/158 |
| 2011/0090407 A1* | 4/2011 | Friedman | H04N 21/42204 348/734 |
| 2011/0111727 A1* | 5/2011 | Chiu | B60R 25/1004 455/404.2 |
| 2011/0111746 A1* | 5/2011 | Chiu | B60R 25/1004 455/422.1 |
| 2011/0118877 A1* | 5/2011 | Hwang | B25J 13/00 700/264 |
| 2011/0175802 A1* | 7/2011 | Hsieh | G06F 3/017 345/156 |
| 2012/0182392 A1* | 7/2012 | Kearns | B25J 11/009 348/46 |
| 2013/0010071 A1* | 1/2013 | Valik | G06F 3/0304 348/46 |
| 2013/0107026 A1* | 5/2013 | Kim | G06F 3/017 348/77 |
| 2013/0259456 A1* | 10/2013 | Viswanathan | F24D 13/00 392/407 |
| 2014/0002624 A1* | 1/2014 | Nemoto | A61B 1/00039 348/65 |
| 2014/0009384 A1* | 1/2014 | Valik | G06F 3/0304 345/156 |
| 2014/0009561 A1* | 1/2014 | Sutherland | B25J 5/007 348/14.05 |
| 2014/0013417 A1* | 1/2014 | Sakai | G06F 3/005 726/16 |
| 2014/0145941 A1* | 5/2014 | Perski | G06F 3/017 345/156 |
| 2015/0002391 A1* | 1/2015 | Chen | G06F 3/017 345/156 |
| 2015/0138068 A1* | 5/2015 | Howard | G06F 3/017 345/156 |
| 2015/0190927 A1* | 7/2015 | Sutherland | B25J 9/1689 700/259 |
| 2015/0217450 A1* | 8/2015 | Huang | B25J 9/1671 700/259 |
| 2015/0234460 A1* | 8/2015 | Irie | G06F 3/017 345/156 |
| 2015/0253777 A1* | 9/2015 | Binney | G05D 1/0214 701/28 |
| 2015/0282282 A1* | 10/2015 | Breuer | H05B 37/0272 315/152 |
| 2015/0346824 A1* | 12/2015 | Chen | G06F 3/017 345/156 |
| 2016/0075017 A1* | 3/2016 | Laurent | B25J 9/163 700/264 |
| 2016/0078289 A1* | 3/2016 | Michel | G06K 9/00389 345/156 |
| 2016/0306432 A1* | 10/2016 | Lee | G06F 3/017 |

* cited by examiner

GESTURE INTERFACE ROBOT

BACKGROUND OF THE INVENTION

Field of the Invention

This invention relates to an intelligent gesture interface robot (GIR) equipped with a video vision sensor to read user hand gestures, to operate computers, machines, and intelligent robots. The unique gesture reading method is that the GIR uses a puzzle cell mapping dynamic multiple sandwich layers work zone of a virtual touch screen mouse, keyboard, and control panel in the user's comfortable gesture action area. The GIR allows the user to easily move hands and push to click. It is easy to operate. It does not require the user to make hands swings action or abnormal body posting actions that the user could get hurt and hit object or others around them. The best gesture solution is my invented method using a puzzle cell mapping gesture method which is considered as a safe and efficient way. The user uses simple gesture actions to control all kind of computer machines all together. It does not require the user to remember which gesture body post for which command. The GIR displays a real time highlight on keyboard graphic image or on a display monitor for visual indication. Therefore, the user knows which command the user selected, and the user extends the user's hand forward to confirm the selection. The puzzle cell mapping gesture command method enables using simple move and click gesture actions to easily control complex multiple computer machines and robots at the same time.

Background Art

The GIR uses a puzzle cell mapping dynamic multiple sandwich layers work zone of a virtual touch screen mouse, keyboard, and control panel in a user's comfortable gesture action area. The user easily move hands and push to click. The user applies easy gesture actions to control complex machines in real time. The GIR prevents injury.

Problems to Solve and Benefits

1. Current gesture systems require users to do big gesture actions that could cause injury. For example, the users hit object or someone around. In addition, extending hands or body muscles rapidly could lead to injury as well. When the users conduct abnormal gesture body action, it could hurt them.

2. In our house, work office, business, everywhere we go, there are tons of remote controllers. Too many keyboards, mice, remote controllers, smart phones, and tablet device controllers may cause trouble. Each controller has its key functions, unnecessary burden to operate, requirement to click many keys to just turn on a TV or DVD to watch. It is difficult to remember which key on which control.

3. It eliminates requirements to build tons of physical mice, keyboards, remote controllers, control panel interfaces on equipment, transportation, cars, airplanes, spaceships, control office centers, etc. It stops wasting resource, pollution and it saves money.

4. A regular gesture device doesn't have the sufficient functions. The regular gesture device requires big body gesture actions. The regular gesture device can not be used to control complex computer actions that users needed.

5. A reduction of unnecessary equipment interface installation can benefit spaceship to reduce weight. It also frees the room space.

6. In space, under zero gravity, a GIR puzzle cell map method is a perfect solution for an astronaut because it uses simple gestures to control computers, machines, and intelligent robots in a zero gravity environment.

7. A GIR makes gesture control in all areas possible. It is in both ways. The GIR has intelligence to make gesture operation easily. It improves our lifestyle, and changes the way that people operate computers, machines and robots all around the world.

8. Soon, an auto self driving car, a flight jet, and a spaceship will become self-intelligent. People need to be able to communicate with autonomous robots by gesture actions. IRIID GIR can be the communication bridge between human and autonomous robot machine world. IRIID will change the way how people operate computers, machines, and intelligent robots in the entire world.

SUMMARY OF THE INVENTION

The above problems are solved by the present invention of a GIR. To solve problems and improve a better way for human controlling computers, machines and intelligent robots, I have purposed the GIR that allows a user to use hands to move in a comfortable area to select a virtual puzzle cell keyboard, a mouse, or a control panel key and to push out the hand toward a selection as a click select action. A video vision of the GIR recognizes a user selection gesture action and its location according to the center point assigned on user. The GIR uses the relative distant on hands location with the center point to determine the X, Y position of a corresponding puzzle cell position. In addition, the GIR can also recognize user push hands locations in a Z direction from a distant change between hands and user body distant. For example, if a hand location being pushed out, the distant between the hand and the user body will increase. The maximum of this push distant is a total length of the hand and arms that normal human can push the hand out.

A GIR can virtually divide this total hand push out distant in 3 selection zones. A first selection zone is an unlocking user hand selection key zone. A second section zone is to move a hand in all directions including UP, Down, Left, Right to select a virtual key selection zone. A third selection zone is to push out as a clicking selection zone. As a result, when the user moves hands in the $2^{nd}$ selection zone, the GIR updates a real time visual puzzle cell map to display both hands position on a graphic puzzle cell map control keyboard displayed on monitor as visual indicate to user. So, the user knows which is left hand's selected virtual key and which is right hand's selected virtual key. The selected virtual keys will be highlighted and increased in font sizes as indications on the graphic puzzle cell map keyboard displayed on the monitor. For example, the left hand selection key is highlighted in red color and with an enlarged font size, and right hand selection key is highlighted in white color and with an enlarged font size. When the user locates the user's hand on the desired selection command, the user pushes the user's hand out in the Z direction into the $3^{rd}$ selection zone. The video sensor of the GIR recognizes user's click action, matches the X, Y with its puzzle cell map and translates it into a computer command, and then send the command to an automation program that has command script, functions, or Marco with action trigger to exercise the command. So, a web server function of the GIR can activate web browser and enter URL plus command text code. The specific web page will be opened with specific command text code with whatever the user selected and embedded in a web link format. When such browser opens the specific web page, a main computer of the GIR can have automation program such as EVENTGHOST that can detect the trigger action and exercise the command included in the same Marco. So each web page URL with particular text code will active a different trigger action and exercise different command accordingly.

The automation program such as EVENTGHOST can also recognize a key clicking event as a trigger, so the GIR can send key click to trigger action. However, there is limited computer keys that can be assigned to particular commands, and also particular physical key will be assigned and can not be used for normal typing function any more. Therefore, recommendations using the web server IIS service and activating specific web page with specific text code is the best way. It unlimitedly assign command by differential folders on each control machines and to trigger Marco actions and to free keys to be clickable as normal computer functions. Once automation program such as EVENTGHOST that can have many folders and include save Marcos with trigger actions, and can detected the specific trigger command, the Marco can exercise command such as sending text key command, display A-Z, 0-9, symbols keys, functions key, open computer program, internet browser, words, calculator, 3D graphic drawing CAD program, etc. In addition, the automation program such as EVENTGHOST can include USB UIRT cable to learn physical Infrared Remote Controller each function keys signal and recorded in Marco action.

When robot program trigger the action, EVENTGHOST will send infrared signal out through USB-UIRT cable device. The IR signal can be used to control a physical machine such as a computer, a machine, and an intelligent robot. For example, robot is sending IR signal out to control a TV to turn ON/OFF. Another example, another computer can be equipped IR receiver, then GIR can send IR signal to control the other computer such as display a-z, 0-9, symbols, function keys, open computer programs, Media, running DVD player, playing music, video, internet browser, playing games, and moving mouse position, Right click, Left Click, Double click, wheel up, wheel down computer functions, etc. As a result, GIR can control self-intelligent machines, and intelligent robots. Soon self-intelligent driving car, flight jet, and spaceship, intelligent robot will be used in people daily home, healthy care, education, medical, transportation, public services, etc.

If a desire to have private own automation program control features being included in the robot program, GIR program can directly be coded with USB-UIRT cable's API library with an add in to be assembled with available functions. So, the GIR program can directly control USB-UIRT cable to improve the IR signal learning and to send out IR signal commands. The GIR can directly control physical machine such as TV, Computer, machines in the robot program without a need to have $3^{rd}$ party automation program such as EVENTGHOST to run it. Similarly, the robot program can send and enter key command directly to the activation program. For example, an enter key to notepad or MICROSOFT WORD, program coding to send text key command to display typed words on the writing program directly without a need to have a third party automation program, too.

Current regular computer interface control device methods are not able to support input function efficiently. Current available gesture input systems that uses traditional vision user body posting like looking art picture images method or requires the user to push hands rapidly, to do wide swings actions that could cause user body injury and hit others and objects nearby. The abnormal body post, or to push out hands rapidly require extent muscle exercise that is not a safe way for normal people to do in long hours to control or to operate machines. Another problem is that those traditional gesture systems require high image process CPU speed, and high cost computer vision program and hardware to be able to recognize some simple gesture positing images. High electricity usage cost demand and its video vision still can not detect all user gesture action accurately. It needs to be specifically defined on each user, and specific fixed location. These are the current traditional gesture systems problems. These are the reasons why those traditional gesture systems are not being used in public for real applications widely.

On the other hand, my proposed GIR is using puzzle cell mapping method. The GIR is acting like a graphic image (Picasso) painter. The GIR program draws the graphic picture of virtual control panels keys. On the display monitor, the puzzle cell virtual control panel keys can be drawn as a grid image of rows and columns cells and be tilted with TextBlock field, then fill in text word to TextBlock field on each grid row and column cells on the graphic image as command. Therefore, inside the program function those text command words can be coded and arranged into a two-dimensional array text strings, then loading each text word into row and column cells, so that display on the graphic puzzle cell image and virtually have assign on user's working space zone. The user can freely work around, sit in chair, the GIR provides user tracking in video view of the user, assign virtual center point on user and create work zone and establish virtual control panel keys in front of user and plus intelligent motor module that can physical rotate video sensor to aim vision tracking on user accordingly when if use walk out of it video view. The GIR can assign virtual center point on user such as prefer work space virtual center point is user's shoulder's center point where join connected with throat neck and establish the work zone size by width, and height. The prefer work space width is each shoulder length×1.5 on each side, so total workspace zone width prefer 1.5+1.5=3 and the prefer work space height is the shoulder's center point up to the user's head center times 2 to 3. Additional virtual points to be assigned on user body if special need for handicap disability users that require special assignment that could be anywhere of user body location. User without arms, could use mouth to hold pointer stick, or water color painting pen to make gesture selection. The left and right shoulder's edge points can be added into program for enhancement of the selection X, Y value reading accuracy, and the hands' palm size value (open and hold fingers) can be added in the program to enhance the click selection reading accuracy. Therefore the GIR creates a prefect comfortable work space zone for the user, and the user can move the user's hands in comfortable space, and in all directions without difficulty, and prevent problems such as injury of themselves, or hitting any others, or objects around. Because the GIR uses puzzle cell mapping method, the GIR can graphically draw any virtual mouse, keyboard, and control panels that the user wanted instantly. The gesture video sensor requires the user to do simple hand moving, and click action. the GIR can be built by using a regular computer, laptop with video camera, lower system electricity consumption, low building equipment cost. The GIR can be used by everyone in convenience, waling moving, sitting and everywhere.

The GIR can be used in all areas on the Earth. Furthermore, under zero gravity environment, physical motion is difficult, the GIR is useful in spaceship that astronaut can use gesture action to move their hands in front of them to control computer, machine, and intelligent robot. The GIR also frees the room space and reduce spaceship weight.

In addition to unique gesture continuous click action, the GIR vision enables the user to move the user's hand in front of the user like a fish swimming using fins smoothly and to softly move each fingers UP and Down like waving fin to control a continuous click action in 3rd click selection zone. In $3^{rd}$ selection zone user's hand palm makes the fish fin waving swimming gesture action as hand sign and the GIR vision program can detect the distance changing, hand's palm center visible blinking like night sky star view, each wave makes a blinking and the GIR automatically blinks to continue click action without requiring the user pulling hand back to $1^{st}$ selection zone to unlock and push out to reselect action. This unique gesture of fish fin waving swimming hand palm sign makes the user very easy to control machines when continuous clicks are required such as TV volume UP/Down, or computer Mouse moving UP, Down, Left, Right, etc.

A new distinguished revolution of computer interface method is that the GIR can support an advanced gesture action of the TouchScreen of Mouse that virtual sandwich layers to combine virtual control panel keys zone functions. The GIR vision program enables the user to decide which hand for TouchScreen Mouse and the other hand can virtually click the virtual puzzle cell Mouse keys. It can assign any commands. The mouse function can be such as Mouse Double click, Left click, Right click, Mouse Left click UP, Mouse Left click Down, Mouse Right Click UP, Mouse Right Click Down, Wheel UP, Wheel Down, etc. For example, if the user uses the user's right hand to click a virtual mouse function on the title menu of the virtual puzzle cell control panel, then the GIR program activates the virtual TouchScreen Mouse function. It enables tracking of the user's right hand location and moving the mouse position accordingly on the display monitor. If the user's right hand moves UP, the GIR program moves the mouse cursor position UP on the monitor accordingly with respect to the distant of the hand moving distant. The moving distance can be determined where its location on the right side of the Work Zone space, and the GIR program calculates the ratio of X, Y distance between virtual center point, and updates the same ratio distant of moving the mouse cursor position in the same direction. Therefore, if the user's right hand draws a circle, the mouse cursor will moves a circle on the monitor in real time. When the user moves mouse cursor on specific position that could be an internet browser web page on the computer desktop screen, the user can push right hand out, the GIR recognizes the click selection. It will do the Mouse LEFT click as default selection click action. Sometimes, the other mouse click action is required. For one example, the other hand can move and click the virtual mouse puzzle cell keys. For another example, the other hand clicks double-click, then the user moves right hand to control TouchScreen Mouse cursor on a program icon, and push hand out, the GIR program will perform the Double click for that click instead of default Left click. Therefore, the program icon will be double-clicked and be running. The other virtual mouse puzzle cell keys are also useful when specific mouse action click needs to be specific. For example, if the user is in view of a large page or a drawing image page, performing the Left Click Down will make the whole drawing image page sheet follow right hand moving in all directions. When the user moves image sheet to right location, conducts virtually Left Click Down click to release the TouchScreen Mouse Grip action, and back to default. The TouchScreen Mouse can be operated by right hand or left hand. Each hand mouse cursor starting position prefers to be initially on corresponding starting location. Because GIR program vision calibrates the user working space zone into 4 sections, X and Y dimension lines across on virtual center point. So, it divides into 4 sections where value of section I, (X+, Y+), section II, (X−, Y+), section III, (X+, Y−), and section IV, (X−, Y−). This means for the right hand will be determine position using X, Y value of section I and III, the Right Hand TouchScreen Mouse program function prefers to have a starting cursor position in monitor LEFT-TOP corner position that is video card monitor 0,0 position. On the other hand, for the left hand will be determined position using X, Y value of section II and IV, then the LEFT Hand TouchScreen Mouse program function prefers to have a starting cursor position in monitor Right-Bottom corner position. If a monitor video card uses a resolution of 1900×1200, then the cursor start position is 1900×1200 on the monitor. The GIR program will determine its video view frame width and height ratio to compare with monitor screen resolution ratio, and moving mouse cursor distance accordingly with hand in all Directions covering 360 degrees. TouchScreen Mouse can use gesture click action with computer virtual keyboard keys buttons as well, and to click keys buttons on computer monitor. If computer windows desktop screen are filled up with click-able buttons on surface, then the user can use TocuhScreen Mouse to select which button to be clicked by gesture action.

In summary, the TouchScreen Mouse is combined with the Virtual Puzzle Cell keys control panels in sandwich layers functions as an advanced gesture system that includes all current computer interface device methods to be the one true universal computer interface device and enable the user to perform gesture control of all machine functions together, and easy gesture to control computer, without need to physical built mouse, keyboard, remote controller, control interface on equipments, machines, robots. The GIR will replace the need for building physical control panels, interface devices, reduce high tech device pollution and save the material resource usage on the Earth.

The GIR can be equipped with output display devices options, such as display monitor, visual image projector on any surface, wireless monitor glass that user can wear and see the project monitor screen in the lances. The GIR can control a wireless BLUETOOTH card attached with micro controller board or a smart phone to control LED light on and OFF to display MORSE code of text command select on, or to generate a vibration long and short signals of MORSE code of text command too. User can wear the wireless display MORSE code text command device on their palm's back and LED lights face direction to themselves, or like a watch. When the user's hand moves on puzzle cell, then the GIR program will send a command to wireless micro controller boards to blink LED light ON/OFF Long and short to indicate which command select on and/or motor vibration long and short signal for silent reading text command. So, the user doesn't need to watch display monitor, and this feature is especially useful for poor eyesight user and blind users so they can perform gesture selection like normal people do.

The GIR can be equipped with a wireless equipment such as BLUETOOTH, Wi-Fi network equipment that can send signal to control other wireless network smart phone, micro controller board, machines, car's BLUETOOTH system, other computer, another machine, another network nodes on the networks, through World Wide Web, Internet TCP/IP protocol and using server-client network software program to remotely control operation and to diagnose configuration of other robot machines, or connect to space signal transmitter station to send signal to space remote control, Harvard Space Telescope, or Rover robot on the Mars, etc.

The GIR will change the way how people use computers, machines, and intelligent robots all around the world.

DETAILED DESCRIPTION OF THE PREFERRED EMBODIMENTS

Figure 1:
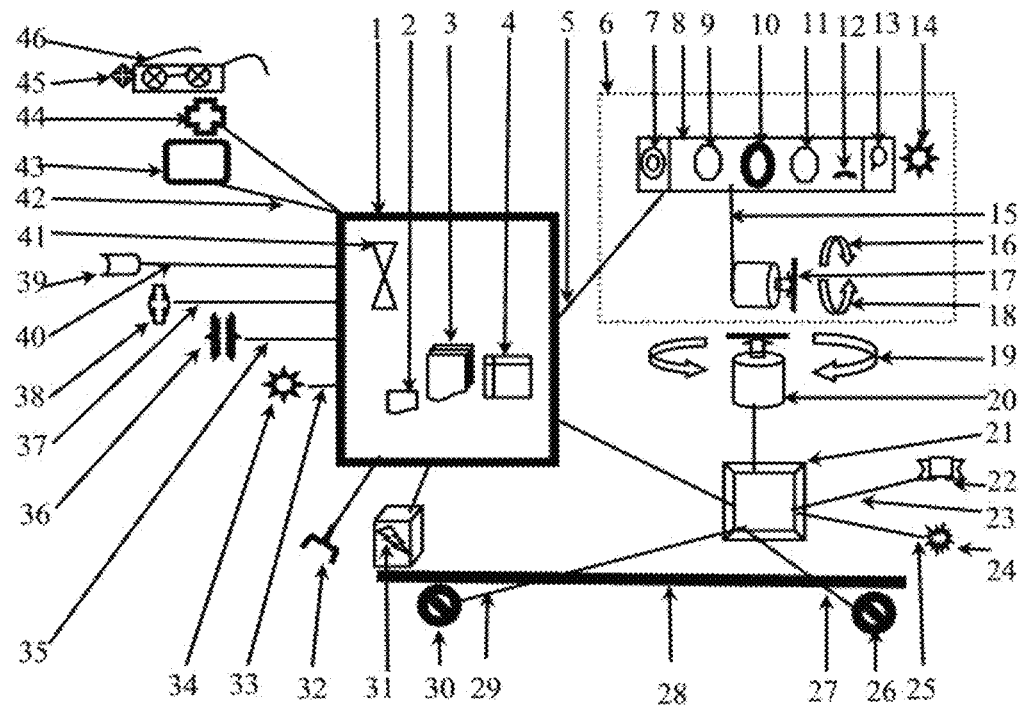
FIG. 1 is a drawing showing the hardware components of a GIR including peripherals wireless network devices, display devices and the robot vision tracking software programs.

In the drawings,

With reference to the drawings, as shown in FIG. 1, the drawing shows the hardware components of the GIR, the vision tracking software programs, peripheral wireless network devices, and display devices.

The complete working example model of the GIR includes,

1. Main Computer 1 used as the GIR's brain to process video, the GIR vision puzzle cell map virtual keyboard control program (PCMVKCP) 3 and automation program 2 (such as EVENTGHOST), web server function 41, such as IIS server.

2. Video vision sensor built with variety type of sensors module 8, combine multiple microphones as sound sensor 7, Infrared Emitter 9, RGB video camera 10 (or use Web Camera instead), Infrared signal reflection detect sensor 11, three-dimensional movement accelerometer sensor 12, speakers 13, and motor control module 17, connect circle signal control line 15, intelligent rotating directions 16, 18. This particular video sensor module system can use MICROSOFT KINECT sensor 6 as available vision sensor parts component sold on the market. In addition, this invention GIR proposal to build in Universal Infrared Receiver Transmitter (UIRT) 14 to this video sensor module as addition IR remote control features to physically operate machines.

3. Micro Controller Board 21 can use Arduino board.

4. Varity of motors modules 20 attached to Micro Controller Board 21. Intelligent rotating directions 19, variety type of sensors modules 24 and GPS 22 sensor, connect cable 23, 25 can be attached to the board for external sensor reading signals by Micro Controller board 21 and send to Main Computer 1 to process.

5. USB-Universal Infrared Receiver Transmitter (UIRT) 34 built in, or USB adapter cable 33, that can learn, record, and sending Infrared signals, recording from any physical IR remote controllers. Usually USB-UIRT cables can send and receive IR signals. Additional IR receiver 36 built in, or USB adapter cable 35 can be attached to Main Computer 1, too.

6. Wireless network equipments such as BLUETOOTH network card 38 built in, or USB adapter cable 37, Wi-Fi network card 39 built in, or USB adapter cable 40, etc., all wireless network protocol card devices, TCP/IP, Internet Protocol such as Xbee, Ethernet, Wify, BLUETOOTH, Cell Phone channel 3G, 4G, GSM, CDMA, TDMA, etc., space telecommunication channel, and satellite channels.

7. Display monitor devices such as display monitor 43, monitor cable 42, image Projector 44 and wireless network (example TCP/IP, or BLUETOOTH) display monitor glass 46.

8. Main Computer power source, wall power plug 32 when the GIR in a fixed installation position, and Kinect sensor 6 power plug source too. Micro controller power source can be used inexpertly or from Main computer 1 through USB connection.

9. Mobile motor wheel platform 28, equipped with motors wheels 26, 30, with motor signal control line 27, 29 for controlling motor rotation direction and speed. All components of the GIR can be placed on the platform 28. The GIR is able to use video vision function to drive itself and to move around. The portable power source 31 can be rechargeable batteries, solar cell, fuel cell, rotation generator, wind turbine, thermo electron generator (TEG), etc. to regenerate electric power for the GIR to Move and to operate. Because motor modules can be built into a variety of the GIR body parts. The motor control can be in the neck, the GIR center body, arms, hands, hip, legs, feet, mimic human physical body part movement. Therefore, it will become a human form of the GIR that can support puzzle cell map virtual keyboard gesture functions.

10. Main Computer 1 is used as the GIR's brain to process video image. The user body part joint location 3 dimension X, Y, Z values can be programmed using MICROSOFT VISUAL STUDIO C# program 4, (or VB), to call KINECT and other system assemble libraries, and to enable KINECT sensor to read user joint values in the program.

11. These basic video sensor reading user's 3D body joint values are available now. Therefore, we can write a specific puzzle cell map virtual keyboard control program (PCMVKCP) 3 that transforms the basic 3D joint value, intelligently measures and calibrates into a new gesture interface input work space zone and establishes puzzle cell virtual keyboard into the zone. So, the user is able to move hands, and to point out to click virtual keys. Those enabling KINECT sensor functions to read joints values can be coded into the (PCMVKCP) program 3. The program 3 can be a class program (for example: MainWindow.xaml.cs) included in the MICROSOFT VISUAL STUDIO C#4 as one project and built into 1 project solution, preferred in WPF Application type project. So, all the video KINECT sensor reading values are available for (PCMVKCP) program to use them in real time programming, creating a dynamic user graphic interface.

12. The GIR uses vision three-dimensional X, Y, Z body parts value for the GIR vision puzzle cell map virtual keyboard control program (PCMVKCP) 3 to be able to create work zone, to establish puzzle cell map virtual keyboards, to provide real-time user hands location, to convert to puzzle cell position, then to match puzzle cell row-column with its puzzle cell command map list, to transfer the cell position to computer command, and to send command to automation program 2 (such as EVENTG-HOST) to run pre record macro script to execute command such as displaying a typed text, running a computer program, sending Infrared signal to remote control TV, DVD, or another computer, mouse movement, mouse clicks, running computer program, internet browser computer operations, etc.

13. Main computer 1 includes web server function 41, such as IIS server and can establish inter server-client network, DNS server, TCP/IPURL, namespace, etc., web site hosting, provide HTML, XMAL, scripting functions. When (PCMVKCP) program 3 can activate a web Browser, send a web page URL including a specific text code, when particular web page is being running and being opened, the automation program 2 (such as EVENTGHOST) detects the particular text code trigger. It will trigger the macro action in the folder.

Figure 2:
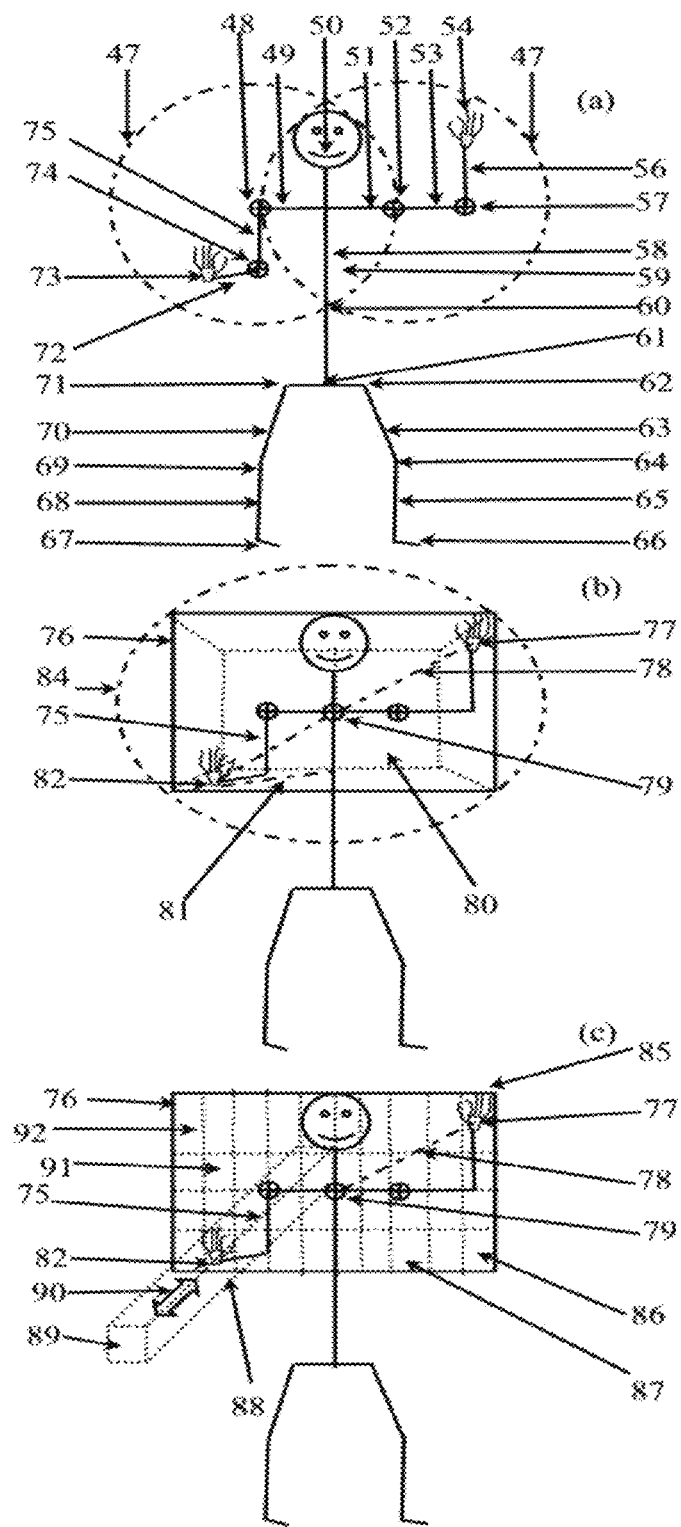
FIG. 2 is a drawing showing the GIR vision program allowing automatic measurement of user's work space, assigning virtual center point, creating work space zone in conformable area, establishing puzzle cell mapping keys, virtually controlling panel in front of the user to be clicked.

FIG. 2 illustrates the GIR (PCMVKCP) program 3 automatically measuring user's workspace, assigning virtual center point, creating workspace zone 76 in conformable area 47, establishing puzzle cell mapping keys (such as 85, 86, 87, 82, 91, 92, and all other cells), virtual control panel keyboard in front of user to click. Using MICROSOFT VISUAL STUDIO C# with assembly, MICROSOFT KINECT and system libraries, program 4 with video sensor can read the user 50 body joint 3D values.

Such as
User Head center 50, Comfortable left and right hand moving circle space area 47,
User Right Shoulder Edge Joint 52,
User Left Shoulder Edge Joint 48,
User Shoulder Center Joint 79,
User Right Elbow Joint 57,
User Left Elbow Joint 74,
User Right Hand 54,
User Left Hand 73,
User Right Hand Palm Center 77,
User Left Hand Palm Center 82, Here are example C# program coding using KINECT 2 body joints 3D reading value to calculate the distant of two joints, This is a direct copy and paste from robot working prototype C# program. See Code section 1 at the end of specification.

So (PCMVKCP) program can use this formula to calculate all the body length. The length of Right shoulder 51 can be calculated by shoulder Center 79 and Right shoulder edge joint 52. The length of Left shoulder 49 can be calculated by shoulder Center 79 and Left shoulder edge joint 48. The length of Right Up Arm 53 can be calculated by Right shoulder edge joint 52 and Right hand elbow joint 57. The length of Left Up Arm 75 can be calculated by Left shoulder edge joint 48 and Left hand elbow joint 74. The length of Right Lower Arm 56 can be calculated by Right hand elbow joint 57 and Right Hand Palm Joint 77. The length of Left Lower Arm 72 can be calculated by Left hand elbow joint 74 and Left Hand Palm Joint 82. Simplifying the other body joints values can be used to calculate user's center body length (58=79 to 61), hip length (71–62), Right upper leg (63=64–62), Left upper leg (70=71–69), Right lower leg (65=64–66), Left lower leg (68=69–67), Right leg length (63+65), Left leg length (70+68). Head length is Head center 50 length×2, and the neck joints length (79–50, or upper neck joint point). Total user height can be approximately calculated by adding all lengths to estimate user's height and the maximum user width. It is likely to be the distance between both edge joints of user's shoulder. A user uses both arms, and the comfortable movement space has limitation areas. The comfortable areas 47 can be defined as in front of user, and in circle around both side. If Left hand moving over right shoulder edge is difficult and right hand moving over Left shoulder Becomes difficult. Both circles of comfortable areas 47 create an overlapped layer area 59 (between shoulders), and 2 circles have intersection point 60 aligning with user body center line 58. When user body joint values, and the length of body are available, the GIR (PCMVKCP) program 3 can use these video sensor-reading values to create a perfect Workspace zone 76 according to the user body measurements. The (PCMVKCP) program 3 will assign a virtual center point on user, which is preferred to be should center joint point 79. The preferred Workspace zone width length is total length of each shoulder length×1.5 (1.5+1.5=3), and the prefer Workspace zone height length is total length of Shoulder Center 79 to Head Face Center×2. The Workspace zone will be tracked as in front of user accordingly at user's shoulder center joint point 79. Therefore, while user walking or moving, the Workspace zone 76 is always at the same place in front of user. If the user walks within the video viewable area, the software keeps digital tracking. When the user walks out of the video view area edge, then (PCMVKCP) program 3, will activate intelligent motor module to rotate video sensor to follow and to aim on user. When the Workspace zone 76 size is defined, then (PCMVKCP) program 3 will divide the Workspace zone into Puzzle Cell Row-Column. For example, if the virtual keyboard need 4 row, and 10 column, total is 40 puzzle cells. Program 3 will divide the width length to 10 and divide the height length to 4. As result, it can determine the length of each puzzle cell area location value according to the virtual center point 79. For example, when user's Right hand 54 moves to Puzzle Cell 85 (Row 1 Column 10), the program 3 calculated the X, Y value of the Right Hand Palm center point 77 with the virtual center point 79, known of X, Y, 2 side length, then the program can calculate the distant of the length to center point 78. Those values can be determined that user's Right hand is on the Row 1 Column 10 location. If user Right hand 54 moves down to Puzzle cell 87, it will be (Row 4, Column 8), and if moves to Puzzle Cell 86, it will be (Row 4, Column 10). By applying the same method, the program can determine that user's Left hand 73, palm center 82 is at Puzzle Cell (Row 4, Column 2) location. If user Left hand 73 moves up to Puzzle cell 91, it will be (Row 2, Column 2), and if moves to Puzzle Cell 92, it will be (Row 1, Column 1). The total selection click zone's 88 max length is limited by total user arm hand length (75+72), (53+56), that is the longer length user can push their hands out. The program defines the maximum hand push out surface 84. For example user push Left hand 73 out and in direction 90, and the ((PCMVKCP) program 3 reads the Left hand palm joint z dimension length value 81 being changed and becoming longer (bigger) between the user body z dimension values. The comparison z dimension value can be assigned as user body z dimension surface 80, center point or left shoulder joint 48 or right shoulder joint 52 to compare when special measurement is needed. This is useful for a handicap user who might use mouth to hold a water color pen to select virtual key to enter. The vision tracking program 3 can use special assignment of any point of the z surface 80 value to determine handicap user's selection click action. Program recognizes the hand push out selection click action, locks the Puzzle Cell Row4-Column2 position and matches Puzzle Cell Map 2 dimension array string code to transfer position into computer command. The selection click zone 88 is divided into 3 selection mode zones. The required detect click action of the hand push out edge 89 is preferred to be shorter than maximum z push out surface 84 to prevent the user to push hand muscle too much, and rapidly too often that could cause body arm injury. This shorter selection click action length feature keeps arm and hand in flexible position and easier for the user to move hands to select virtual keys.

Figure 3:
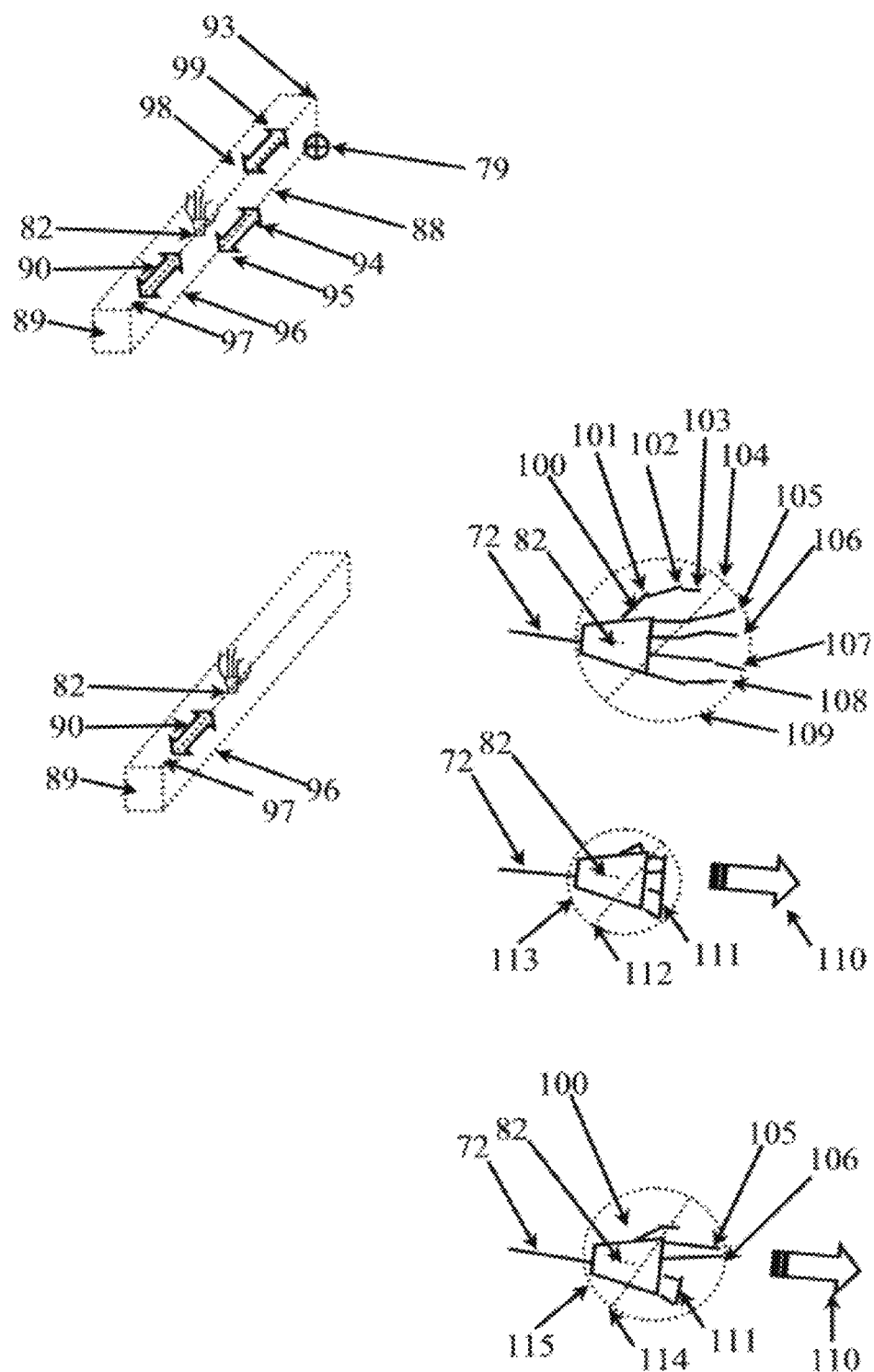
FIG. 3 is a drawing showing the hand push out in z direction and push to click a virtual key, and the z dimension distant, between hand palm and user body distant, has been divided into 3 zones, $1^{st}$ selection unlock selected key gate zone, $2^{nd}$ moving to select virtual key zone, and $3^{rd}$ push hand to click the selected virtual key zone; in addition, showing unique special GIR fingers hand sign enhancing selection control accuracy.

FIG. 3 illustrates the hand push out in z dimension to click virtual key. The z dimension distant 88, between hand palm 82 and user body point 93 distant is divided into 3 zones, $1^{st}$ selection unlock selected key gate zone 99 between user body point 93 to $1^{st}$ select zone edge point 98, $2^{nd}$ moving to select virtual key zone 94 between 1st select zone edge point 98 to $2^{nd}$ select zone edge point 95, and $3^{rd}$ push hand to click the selected virtual key zone 96 between $2^{nd}$ select zone edge point 95 and $3^{rd}$ select zone edge 89. In addition, FIG. 3 shows a unique special GIR fingers hand sign enhancing selection control accuracy. Program 3 can detect user Left hand palm center 82 in pulling and pushing action in direction 90. In $2^{nd}$ select key zone, the user moves hands and keeps hands in $2^{nd}$ zone area to select and change any key freely. In default, when the user's hand extends in a Push out direction, the program detect "Push" action. It will lock the puzzle cell position. So, it will not be changed even when X, Y is changed during the hands pushing out.

A special GIR gesture hand sign to move fingers like a spider walking its legs is described so as to change nearby puzzle cell selection. For example, User Left hand palm 82 can stay in the $2^{nd}$ select key zone 94, hand fingers 103, 105, 106, 107, and 108 move like spider legs walking gesture, the puzzle cell row-column lines like spider web net. So, tiny moving fingers in waking direction of up, down, left, right, the program can detect the most area hand palm 82 on which puzzle cell. So, the user doesn't need to make big hand movement to change puzzle cell where just beside the current selected puzzle cell position. Each finger has 2 joints sections. For example, finger 103 has two joints 101, 102, connecting to hand palm at joint 100.

When all fingers 103, 105, 106, 107, 108, the Left hand palm 82 and detected circle area size 109 diameter length 104 is larger than when all fingers close and holding 111, the vision tracking program detects hand area circle 113, diameter 112 become smaller. This difference becomes useful for enhancing puzzle cell selection. When the user locates select command, then closes all fingers and pushes hand out, program will lock the puzzle row-column value regardless even hand moving in X, Y directions. The puzzle cell position will not be changed. This special GIR hand gesture feature is useful when the user needs to rush to click a virtual key for sure in an emergent situation such as in spaceship out of control or user has shaking hands illness problem. The program will support for the need.

In the 2$^{nd}$ select key zone 94, user Left hand can change fingers. For example, fingers 105, 106, the special GIR hand sign look like a gun gesture pointing to puzzle cell. So, the program sees the hand holding and then fingers pointing out that make different. The program selects to lock the key. Tiny gun gesture point area makes vision tracking accurate. So, the user moves or rotates finger gun point, and applies small movement to change key selection. If the user wants to select other key, simply pulls hand 82 back to 1$^{st}$ zone. The program detects "Pull" action then unlock the selection key to be free to reselect any key again by user. In 3$^{rd}$ selection click zone 96 and using fingers tiny movements by different fingers gun point out or holding tight, or open all fingers or close hold all fingers to make a puzzle cell select to click 97.

Figure 4:
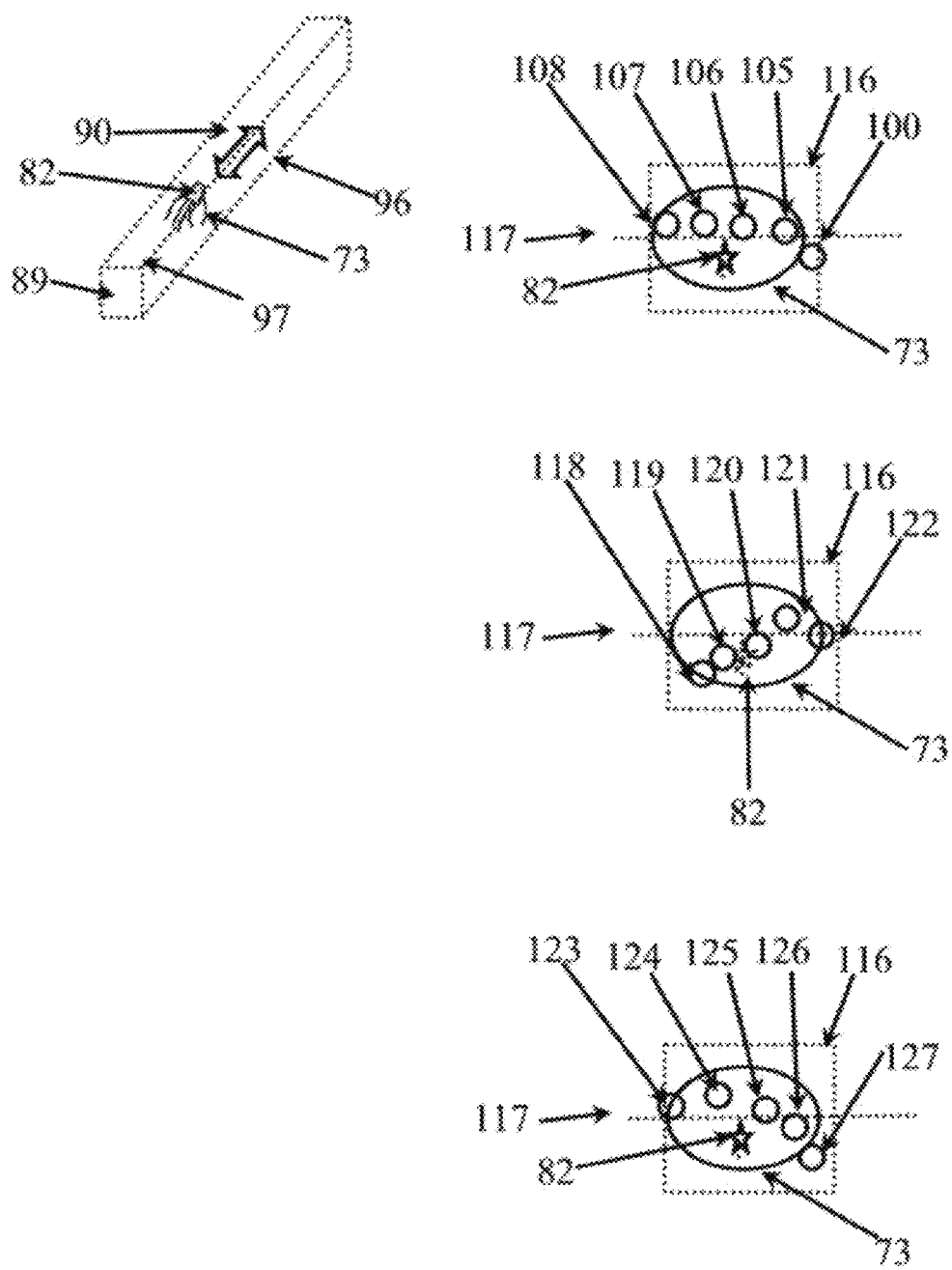
FIG. 4 is a drawing showing a special GIR hand sign gesture moving like fish swimming its fins, moving fingers up and down routing 1 by 1 that making waving fingers hand sign in the $3^{rd}$ selected zone, vision program will detect and continuously click virtual key without pull hand back to unlock selected key gate zone.

FIG. 4 is a drawing showing a special GIR hand sign gesture to continuously click without pulling hand back to unlock. By moving like fish swimming its fins, moving fingers 100, 105, 106, 107, 108 up and down between horizontal line 117 routing 1 by 1 that makes waving fingers GIR hand sign gesture in the 3$^{rd}$ selected click zone 96. The vision tracking function in program 3 will detect hand size area 116, hand palm center point 82 distant value. While fingers waving down positions 118, 119, 120, 121, an 122, palm face down area 73, the hand palm center point 82 will be covered. So, the program could not see the point 82, then fingers moving UP area to position 123, 124, 125, 126, 127, the hand palm center 82 appeared again in vision tracking function in the program 3. It causes the blink distant z value to be different from that program detects and performs continuously click virtual key on each blinking, without the need for the user to pull right hand 73 back to 1$^{st}$ unlock selected key gate zone and push to click.

Figure 5:
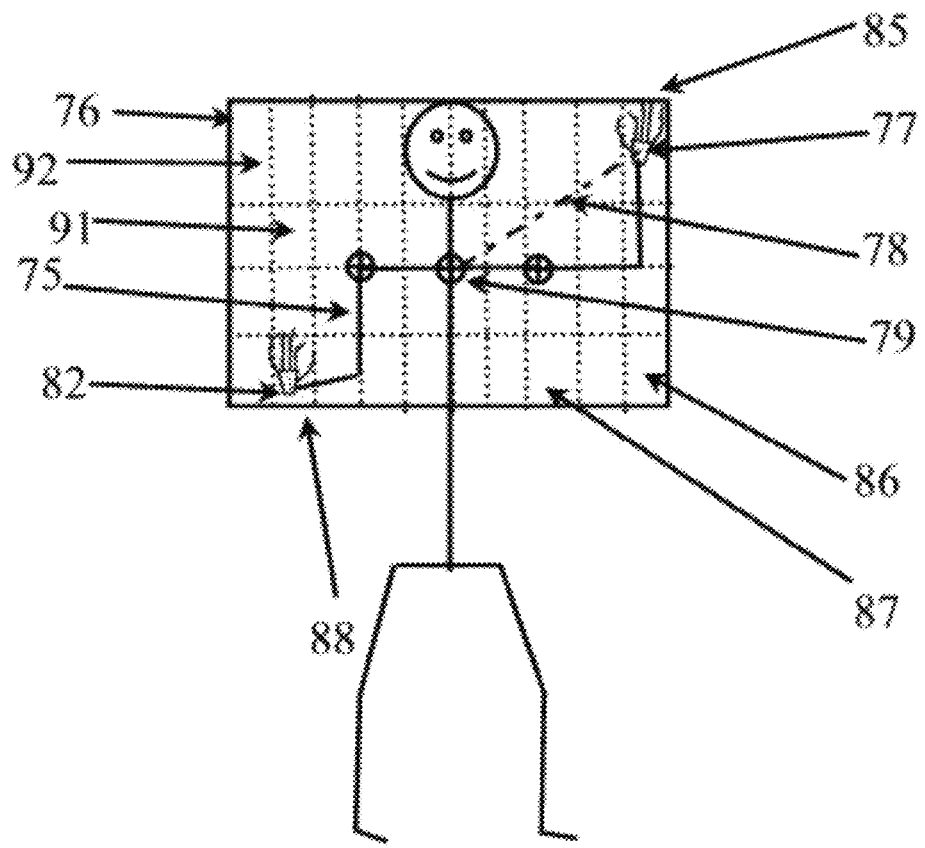
FIG. 5 is a drawing showing the GIR vision program to track user's hands position in the work zone. Using hands X, Y distant between center points to determine which virtual puzzle cell position is being selected. The GIR vision program draws virtual puzzle cell map keys control panel graphic image on display monitor. Vision program tracks user's hands location to determine which keys are selected. On display monitor, vision program highlights particular puzzle cells as visual indication. The user knows which keys that they are selected on right hand and left hand.
Figure 5:
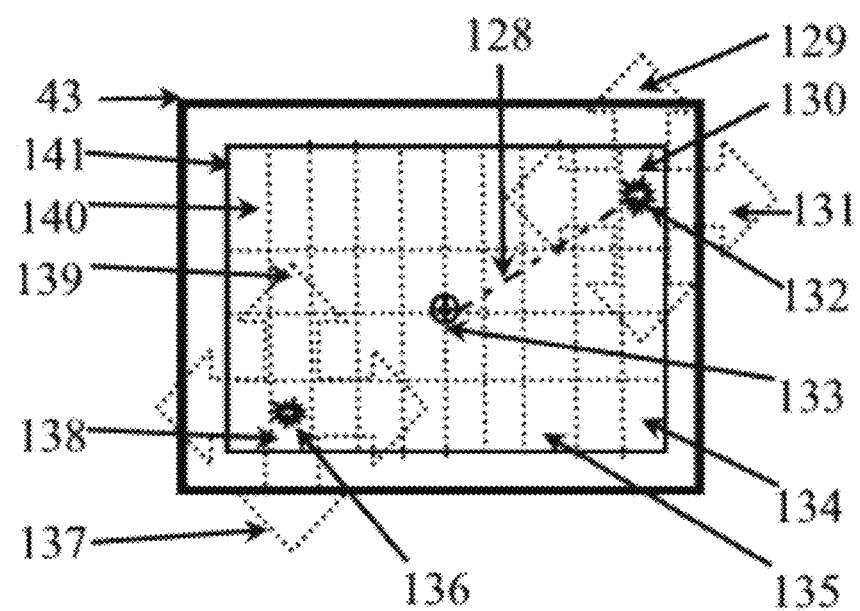

FIG. 5 is a drawing showing the GIR vision program to track user's hands position 77, 82 in the Workspace zone 76. Using Right hands X, Y distant 78 between center points 79 to Right hand palm 77, it determines which virtual puzzle cell position 85 is being selected. Using Left hands X, Y distant between center points 79 to Left hand palm 82, it determines which virtual puzzle cell position (Row 4 Column 2) is being selected.

The GIR vision program draws virtual puzzle cell map keys control panel graphic image 141 on display monitor 43. Vision program uses the tracking of user's hands 77, 82 location to determine which keys are selected, and real time update on display monitor 43. The vision program highlights 130, 138 in different colors, enlarges font sizes on the particular puzzle cells 132, 136 as visual indication. The user knows which keys that are selected on right hand palm 77 and left hand palm 82. The graphic puzzle cell map image center point 133 matches with virtual workspace center point 79. So, hands X, Y values can be matched on the graphic puzzle cell map image on select keys correctly. If Left hand palm 82 moves in an up direction 139, the highlight will change to puzzle cell 140. If left hand moves down and out of puzzle cell map area 137, the program will not indicate any select key. It could be because the user puts down hand and has no intention to select key situation. If user Right hand 77 moves down, the X, Y values and distant 128 are also changed. The program will highlight on puzzle cell 134 or 135 where user select. If Right hand moves out the workspace zone, then no key select 129. User can decide to use both hands to select keys, or to use left hand only and to use right hand only. The vision tracking function in the program 3 can support to recognize all hands inputs.

Figure 6:
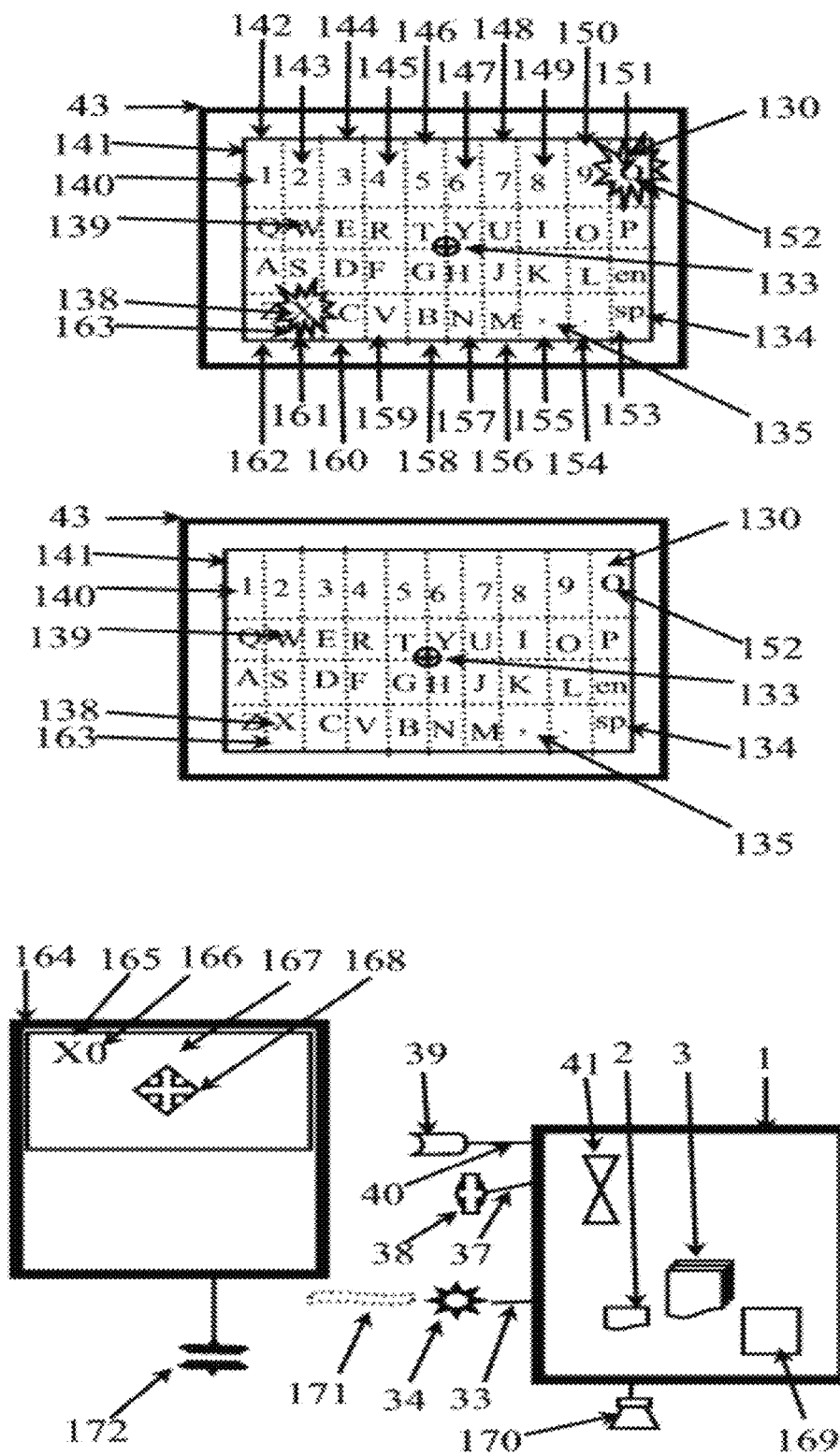
FIG. 6 is a drawing showing the GIR vision program drawing virtual puzzle cell map keys control panel as graphic image like watercolor painting artist (Picasso). Program draws the virtual keys in Grid Row and Column cells, and inserts TextBlock field into each grid cell, then fills text word into TextBlock field as indication command for user to select. For example, a QWERT standard virtual puzzle cell keyboard. In addition, the GIR vision program is able to work with automation program to control USB-UIRT cable to send Infrared signals to remotely control another computer keyboard and mouse operation.

FIG. 6 is a drawing showing the GIR vision program drawing virtual puzzle cell map keys control panel graphic image 141 like watercolor painting artist (Picasso). Using WPF project in Visual C#, it has dynamic graphic user interface tool. So, the vision program can use grid command to draw the puzzle cell virtual keys in Grid Row and Column cells, and can insert another TextBlock field into each grid cell, and then can fill text word (0-9, a-z) into TextBlock field as indicate command for user to select. For example, loading 1-0 to TextBlock 142, 143, 144, 145, 146, 147, 148, 149, 150, 151 that place on the puzzle cells of the row 1, and "Z" into TextBlock 162, "X" into TextBlock 161, "C" into TextBlock 160, "V" into TextBlock 159, "B" into TextBlock 158, "N" into TextBlock 157, "M" into TextBlock 156, "," into TextBlock 155, "." into TextBlock 154, and "SP" (Space) into TextBlock 153 that place on the puzzle cells of the row 4. All other keys are loaded in the same from a puzzle cell 2 dimension string array code, and loading each character to its support cell position, as result, a QWERT standard virtual puzzle cell keyboard 141 is created. Vision program highlights 130, 138 in different colors, enlarges font sizes 152 163 on the particular puzzle cell command "X" and "0" as visual indication. The user knows which keys that are selected. When the user clicks, the program 3 uses the puzzle cell position (Row, Column) to call the puzzle cell 2 dimension string array code and to obtain the text word command. If user Right hand moves to "SP" and clicks, then the program displays typing space, if ",", program typing display ",".

If Left hand selects "W" 139, then the program sends key typing display "W", if select "1", then sends word "1" to display.

In addition, the GIR vision program is able to work with automation program 2 (For Example EVENTGHOST) to control USB-UIRT cable 34 to send Infrared signals 171 to remotely control another computer 164 with IR receiver 172, to control its keyboard to type and display "X" and "0" on notepad program 167 on monitor. While puzzle cell loading mouse keys, the user is able to click to send mouse moving IR signal 171 to control the other computer 164 to move its mouse 168 position and to do mouse 168 click operation. The command execution signal can also be sent by BLUETOOTH device to control a BLUETOOTH micro controller board device that the user wears on himself or herself to blink LED light as MORSE code, or vibration long-short as MORSE code signal. It can send signal through Wi-Fi network device 39, TCP/IP, Internet network server-client program to control another node on the network, computer, machines, and intelligent robot.

Using the web server 41 IIS service and activating specific web page 169 with specific text code is the best way. It allows unlimited assignment command by differential folders on each control machines and trigger macro actions individually. This is the way to free keys locked and to keep keyboard clickable as normal computer functions. Once automation program 2 such as EVENTGHOST can create many folders to save macros script with trigger actions, and can detect the specific trigger command events, the Marcos can exercise command such as sending text key command, display A-Z, 0-9, symbols keys, functions key, open computer program, internet browser, words, calculator, 3D graphic drawing CAD program, etc. In addition, automation program 2 such as EVENTGHOST can include USB UIRT cable 34 to learn physical Infrared Remote Controller each function keys signal and recorded and sent out by macros script action.

When the GIR program triggers the action, EVENTGHOST will send infrared signal 171 out through USB-UIRT cable device 34. The IR signal can control a physical machine such as computer 164, machine, and intelligent robot. For example, the GIR sends IR signal 171 out to control a TV to turn ON/OFF. Another example, another computer 164 can be equipped with IR receiver 172, then the GIR can send IR signal 171 to control the other computer 164 such as display a-z, 0-9, symbols, function keys, open computer programs, Media, running DVD player, playing music, video, internet browser, playing games, and moving mouse 168 position, Right click, Left Click, Double click, wheel up, wheel down computer functions, etc. As a result, the GIR can control self-intelligent machines, and intelligent robots. Soon, self-intelligent driving car, flight jet, and spaceship, and intelligent robot will be used in people daily home, healthy care, education, medical, transportation, public services, etc.

In addition, the GIR program can have privately owned automation program 2 functions control features included in the GIR program 3. The GIR program can directly code with USB-UIRT cable's API library with add in to be assembled with available functions directly in (PCMVKCP) program 3 function code. So, the GIR program can directly control USB-UIRT cable to IR signal learning, record and send out IR signal commands. The GIR can directly control physical machine such as TV, Computer, machines in the GIR program without a need to have $3^{rd}$ party automation program 2 such as EVENTGHOST to run it. Similarly, the GIR program can send enter key command directly to the activation program. For example, enter key to notepad or MICROSOFT WORD, program coding to send text key command to display type words on the writing program directly without a need to have $3^{rd}$ part automation program, too.

When user selects key, the program can enable speaker 170 to read the character and give voice feedback.

Figure 7:
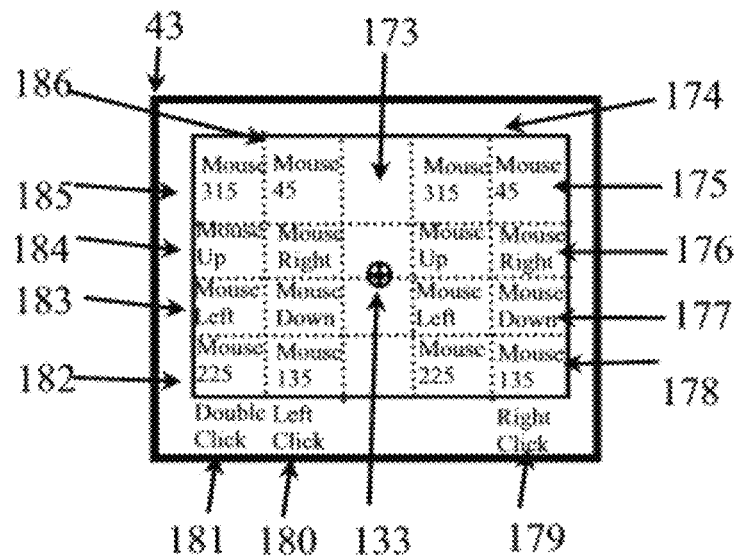
FIG. 7 is a drawing showing vision program drawing a mouse keyboard and a control panel. User can select the virtual keys to control mouse position, and mouse click functions. In addition, the virtual puzzle cell map keyboard, control panel, prefer special interface section arrangement, can be divided into Left and Right hand zones, a reservation of the center area of work space to display real-time user image video, showing user action. the user can see the user himself or herself on the display monitor with virtual keyboards together. This special virtual gesture interface arrangement makes good visual feedback and indication and is easy for eyes during user's operation.
Figure 7:
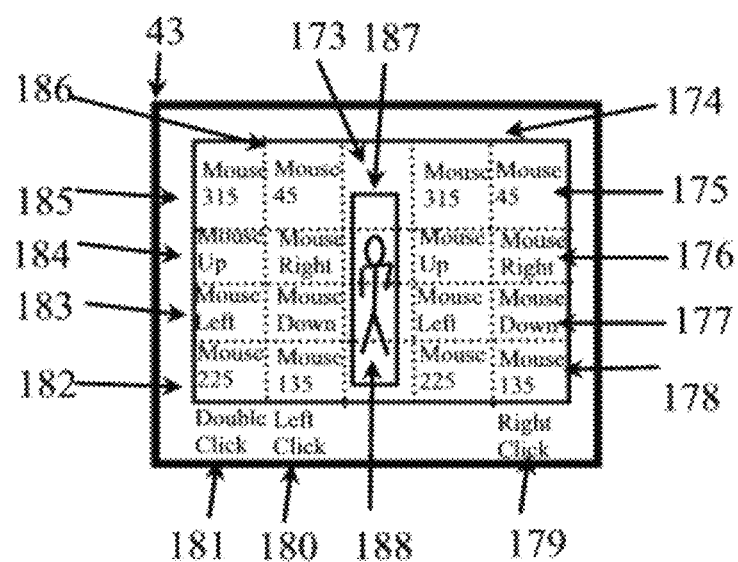

FIG. 7 is a drawing showing vision program drawing a mouse keyboard, control panel on virtual puzzle cell map keys control panel graphic image, divided into 2 mouse sections, Left hand mouse 186, and Right Hand mouse 174.

Loading mouse command word to TextBlock field, "Mouse 315" to TextBlock 185, "Mouse Up" to TextBlock 184, "Mouse Left" to TextBlock 183, "Mouse 225" to TextBlock 182, "Double Click" to TextBlock 181, "Left Click" to TextBlock 180, "Right Click" to TextBlock 179, and all other keys.

User can select the virtual keys to control mouse position, and mouse click functions. In addition, the virtual puzzle cell map keyboard, control panel, preferred special interface section arrangement, can be divided into Left and Right hand zones. The center area 173 of virtual puzzle cell map keys control panel graphic image is reserved to place a real time video image 187 that shows user actions 188. So, the user can see himself or herself and all the control virtual keys together on monitor. This special virtual gesture interface arrangement makes good visual feedback indication controls and is easy for eyesight during user operation.

In a real example of GIR program for mouse key control interface arrangement, it is in a preferred arrangement having the interface of mouse keys control panel to support both in Left Hand Mouse Key area and Right Hand Mouse Key area with all direction moving keys, UP, DOWN, LEFT, Right, 45 degree, 135 degree, 225 degree, and 315 degree keys. The mouse movement can have 1 small move key for UP, Down, Left, right, 45, 135, 225, 315. This is useful when mouse is near the target to be clicked. So, it works for tiny mouse movement for mouse to select on the target. The mouse movement can have 1 large move key for UP8, Down8, Left8, right8, 45-8, 135-8, 225-8, 315-8. "8" means 8 times of moving distance of small mouse movement. This is useful when mouse is in some distant to move to the target. So, it works for large mouse movement for mouse to select on the target, less click gesture action. All Mouse Keys selection click is not locked in $3^{rd}$ selection click zone. It means that all mouse keys can be re-clicked again in the $3^{rd}$ selection click zone without pulling hand back. Combining Fish Swimming Fin gesture, the user can very easily control mouse location with accuracy to point on the target and to do mouse click functions. Please see "II" comment of array key defining distant and multiple speed keys beside code. A preferred arrangement is a 7 Rows, 17 Columns puzzle cell Mouse Key Controller map.

And

Puzzle cell Size (H×W) will be calculated by Workspace Zone size (H×W) divided by the rows, and columns. Here is an example C# program coding function to arrange Puzzle Cell Map List for Mouse Key Controller commands by 2 dimension string array in C# code. See code section 2 at the end of the specification.

When the user applies a gesture to click, vision tracking function in the program 3 uses the puzzle cell position (Row, Column) to call the particular (Row, column) array string value of the puzzle cell 2 dimension string array code and to obtain the text word command. For example, if user Right hand moves to "MU" and clicks, the program activates specific web page and generates a HTTP browser command Example HTTP coding from working prototype. Copyright Type a pre-determined URL address in Browser URL and enter. The web page activates a link to trigger automation program EVENTGHOST trigger event (KEYS Folder, MU event), and exercises the MU Marco script to send out Infrared Signal to control another computer to move its mouse position UP for a small distance. If "MU8", then the other computer moves a corresponding mouse position UP for a large distance. If "ML225", then the other computer moves the corresponding mouse position for 225 degrees and for a small distance. If "ML225-8", then the other computer moves the corresponding mouse position for 225 degrees and for 8 times of the small distant.

The puzzle cell keys can be defined in software function coding by allowing the keys to be capable of multiple click, multiple speed, different move distant. It enables multiple clicks by 1 gesture action and also allows it to control the lock or unlock the key that to enable re-click in $3^{rd}$ zone key. When the user uses GIR special gesture hand sign, it can continuously click virtual keys easily in $3^{rd}$ selection click zone.

This key control definitions method is used for all other keys and actions in all virtual control panels, keyboards. The first Row of virtual keyboard controller is reserved for robot function menu, and the last row is reserved for program controls, change controller, etc.

Figure 8:
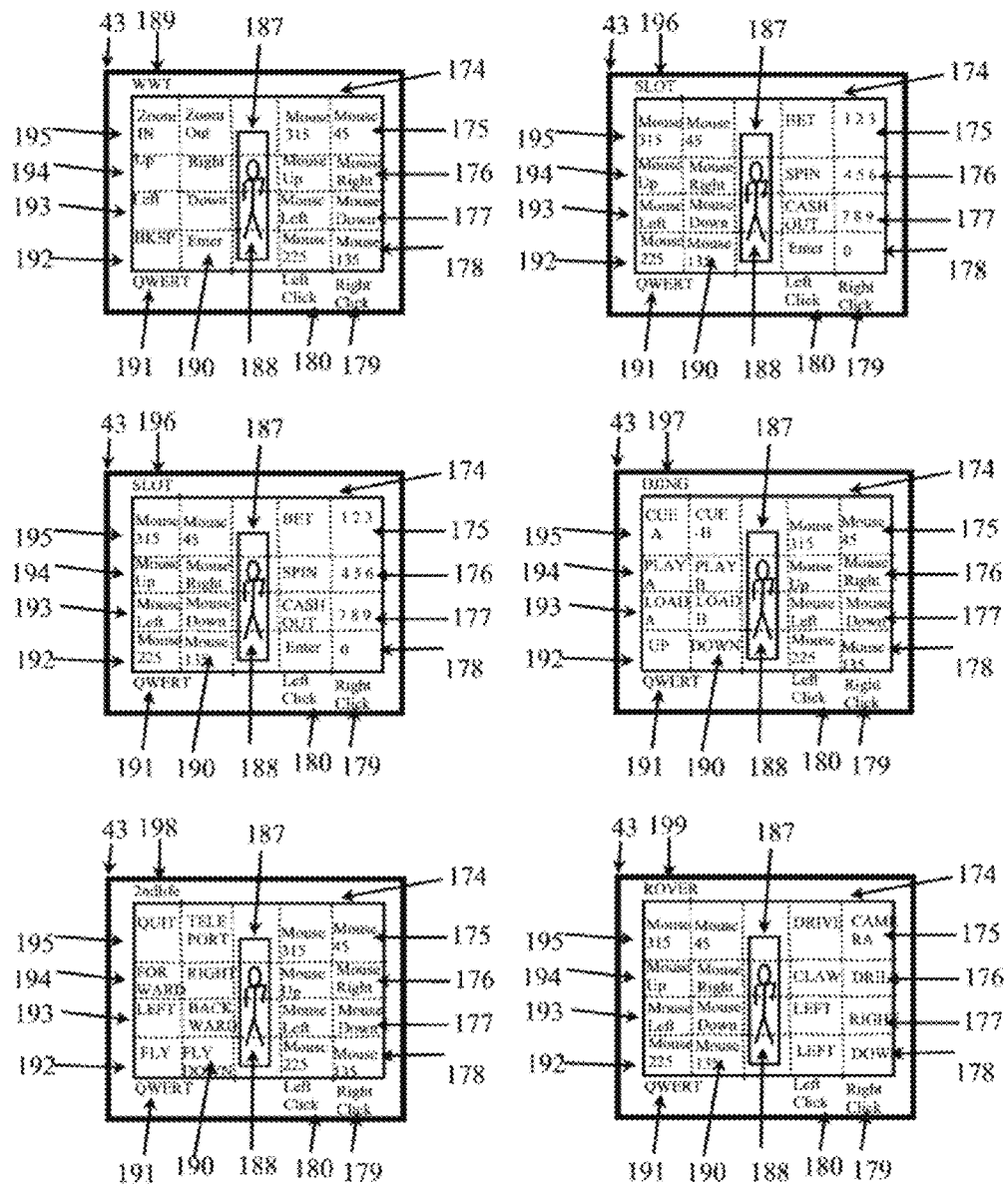
FIG. 8 is a drawing showing that the GIR can create any keyboard and control panel that the user wanted. It includes varieties of virtual keyboards and control panels. Each keyboard has its own control commands being filled into each row-column puzzle cell. The virtual keyboards drawings are to be shown as examples

FIG. 8 is a drawing showing the GIR creating any keyboard and controlling a panel that the user wanted.

If the user selects WWT controller, then the program draws a new virtual puzzle cell map keys control panel graphic image to a virtual control panel WWT 189 for MICROSOFT WORLD WIDE TELESCOPE program. It fills in special WWT command words, "Zoom In" 195, "Zoom In" 195, "Up" 194, "Left" 193, "BKSP" 192, "QWERT" 191, "Enter" 190. On the right side 174, it draws mouse control keys such as "Left Click" 180, "Right Click" 179 and all other keys on its cell.

Inside the program function, those text command words can be coded and arranged into a two-dimensional array text strings. It loads each text word into row and column cells.

So, the display on the graphic puzzle cell image is virtually matched with the user's working space zone, The varieties of virtual keyboard, control panel, each keyboard has its own control commands. It fills into each row-column puzzle cell. The virtual keyboards drawings are shown as examples If the user selects SLOT controller, then the program re-draws a new virtual puzzle cell map keys control panel graphic image to a virtual control panel SLOT 196 for controlling a SLOT machine simulation program.

If the user selects DJING controller, then the program re-draws a new virtual puzzle cell map keys control panel graphic image to a virtual control panel DJING 197 for controlling a Disco DJ machine simulation program.

If the user selects 2nd Life controller, then the program re-draws a new virtual puzzle cell map keys control panel graphic image to a virtual control panel 2ndLife 198 for controlling a virtual 3D world avatar in $2^{nd}$ Life viewer program.

If the user selects ROVER controller, then the program re-draws a new virtual puzzle cell map keys control panel graphic image to a virtual control panel ROVER 199 for controlling a Mars Rover simulation program to control rover robot to drive, take pictures, transmit pictures back to Earth, use Claw, Driller to take rock samples, intelligent robot operations, etc.

Figure 9:
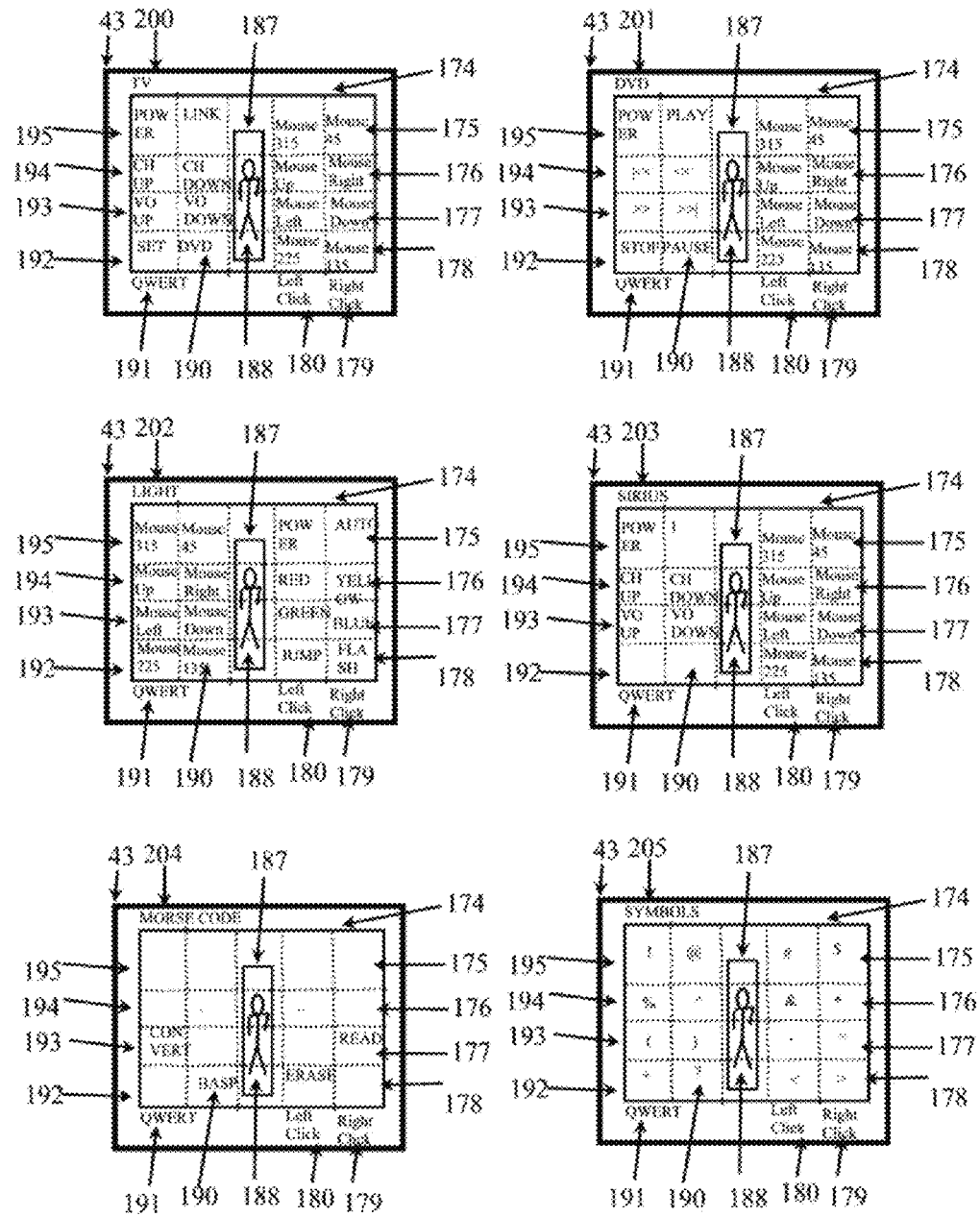
FIG. 9 is a drawing showing examples of virtual keyboards drawings to show that the GIR is able to support computer operation functions.

FIG. 9 is a drawing showing examples of virtual keyboards drawings that the GM is able to support computer using USB-UIRT to remotely control machines such as TV, DVD, SIRIUS radio, Disco Light, and special MORSE Keyboard, etc.

For example,

If the user selects TV controller, then the program re-draws a new virtual puzzle cell map keys control panel graphic image to a virtual control panel TV 200 for controlling TV functions.

If the user selects DVD controller, then the program re-draws a new virtual puzzle cell map keys control panel graphic image to a virtual control panel DVD 201 for controlling DVD functions.

If the user selects LIGHT controller, then the program re-draws a new virtual puzzle cell map keys control panel graphic image to a virtual control panel LIGHT 202 for controlling LIGHT functions.

If the user selects SIRIUS controller, then the program re-draws a new virtual puzzle cell map keys control panel graphic image to a virtual control panel SIRIUS 203 for controlling Sirius radio functions.

If the user selects MORSE code Keyboard controller, then the program re-draws a new virtual puzzle cell map keys control panel graphic image to a virtual control panel MORSE code 204 for using MORSE Code to enter key functions. In the puzzle cell Row 2, Column 2 a "." representing "Di", and puzzle cell row 2, column 4 a "-" representing "DHA". The user can click on the cells to make "Di", "DHA" signals, ((PCMVKCP) program 3 includes MORSE code signals converted to A-Z, 0-9 functions. So, the user enters MORSE Code, then the user clicks CONVERT 193, it is transferred to character to execute command. The Read command is used during the MORSE code enter stage. The user can read what code has been entered so far, and can Erase all and can re-enter again and can click BKSP 190 to delete just a signal "Di", "DHA". This GIR MORSE Code Keyboard is useful for poor eyesight user, and blind user to enter command by the simplest gesture action "Di", "DHA" actions to control machines.

If the user selects SYMBOLS controller, then the program re-draws a new virtual puzzle cell map keys control panel graphic image to a virtual control panel SYMBOLS 205 for controlling another computer enter display symbols keys.

Figure 10:
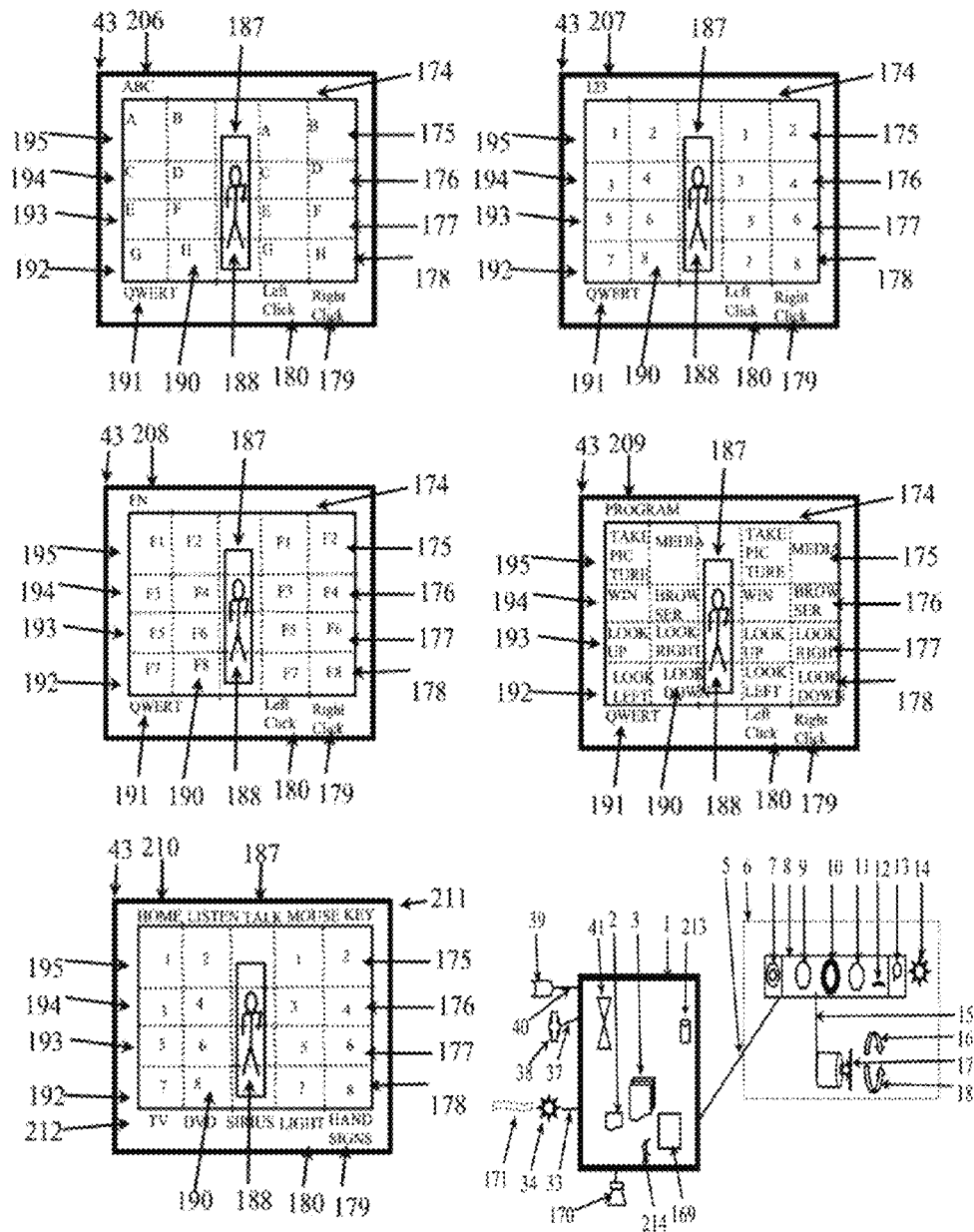
FIG. 10 is a drawing showing examples of virtual keyboards drawings to show that the GIR is able to support computer operation functions. In addition, the GIR uses peripheral devices to control, network devices, computers, machines, and intelligent robot. The GIR can be equipped with speech recognition program function, array of microphones used as sound sensors, and be equipped with voice speaking program function used as speakers for voice feedback.

FIG. 10 is a drawing showing examples of virtual keyboards drawings that the GIR is able to support computer operation functions.

If the user selects ABC controller, then the program re-draws a new virtual puzzle cell map keys control panel graphic image to a virtual control panel ABC 206 for controlling another computer enter display A-Z keys.

If the user selects 123 controller, then the program re-draws a new virtual puzzle cell map keys control panel graphic image to a virtual control panel 123 207 for controlling another computer enter display 0-9 keys.

If the user selects FN controller, then the program re-draws a new virtual puzzle cell map keys control panel graphic image to a virtual control panel FN 208 for controlling another computer enter Function F1-F12 keys.

If the user selects PROGRAM controller, then the program re-draws a new virtual puzzle cell map keys control panel graphic image to a virtual control panel PROGRAM 209 for controlling another computer to execute computer program to run. Example click "Take Picture" Robot will take picture of the user and save the picture. If the user clicks the "LOOK UP", "LOOK RIGHT", "LOOK LEFT", "LOOK DOWN" keys, the GIR will control its motor module to rotate its video sensor to turn UP, RIGHT, LEFT or Down direction.

In the special arranged area of virtual puzzle cell map keys control panel graphic image, on the first row area 211, it is reserved for the GIR operation function menu. For the last row 212 area, it is reserved for program type of control panels. This makes it easier when the user wants to use different controller, the user can find it at last row. When the user wants to configure the GIR support function the user searches the first row of puzzle cell map image. A special "HOME" 210 link is available for fast return to start program position, or when the user gets lost in menu structure and wishes to jump back to start.

Figure 11:
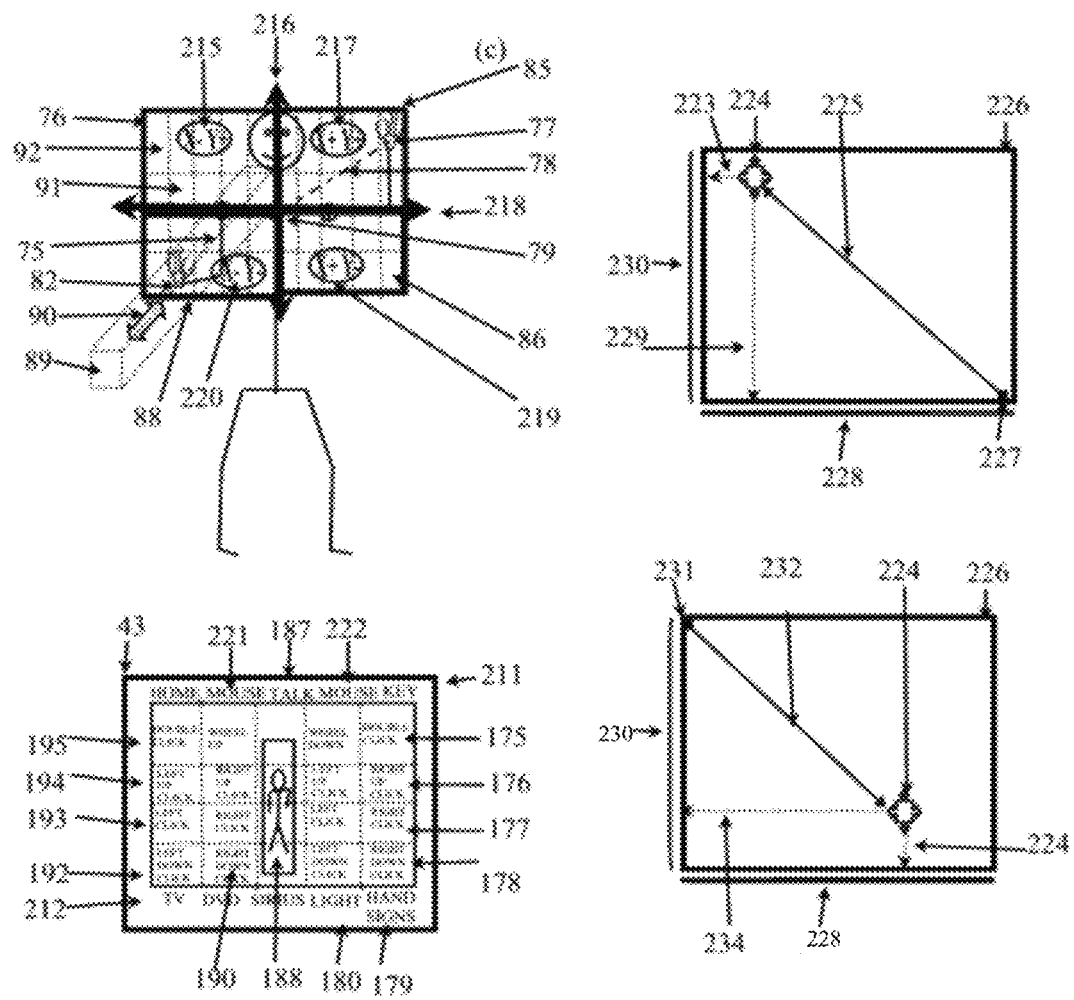
FIG. 11 is a drawing showing an advanced TouchScreen Mouse combined with a puzzle cell virtual keyboard in sandwich layers method.

In addition, the GIR uses peripheral devices to control network devices, computers, machines, and intelligent robot. The GIR can be equipped with speech recognition program function 213. An array of microphones are used as sound sensors. The GIR is equipped with a voice speaking program function 214 that uses speakers to voice feedback. The GIR vision program can support Hand Sign Language function 179. Each hand and fingers gestures and positions value on each video frame will be compared and distinguished by the hand sign on puzzle cell area to determine what hand sign language and program will execute the command FIG. 11 is the drawing showing an advanced TouchScreen Mouse 224 combined with puzzle cell virtual keyboard 221 in sandwich layers method.

The GIR supports a new revolution gesture input of computer interface method. The GIR can support an advanced gesture action of the TouchScreen of Mouse 224 that virtual sandwich layers are used to combine virtual control panel keys zone function. The GIR vision program 3 enables the user to decide which hand for TouchScreen Mouse 221, 222 and the other hand can virtually click the virtual puzzle cell Mouse keys. It can be assigned any commands. The mouse function can be such as Mouse Double click 195, 175, Left click 193, Right click 177, Mouse Left click UP 194, Mouse Left click Down 192, Mouse Right Click UP 176, Mouse Right Click Down 178, 190, Wheel UP, Wheel Down, etc.

For example, if the user uses right hand to click virtual mouse 222 function on the title menu 211 of the virtual mouse, then the GIR program 3 activates the virtual Touch-Screen Mouse 224 function, disables Right Hand select and enables Left Hand select only on virtual keys, and enables tracking user's right hand 77 location and moves the mouse 224 position accordingly on the display monitor 43. If the user's right hand 77 moves UP, the GIR program moves the mouse 224 cursor position UP on the monitor 43 accordingly for the distant 78 of the hand movement distant. The movement distance can be determined where its location on the right side of the Work Zone space 76. the GIR program calculates the ratio of X 234, Y 224 distance between virtual center point 79, and updates the same ratio distant 232 moving the mouse 224 cursor position in the same direction. Therefore, if user's moving right hand 77 makes a circle, the mouse 224 cursor will move a circle on the monitor 43 in real time. When the user moves mouse 224 cursor on specific position that could be an internet browser web page on the computer desktop screen 226, the user can push right hand out, the GIR recognizes the click select, it will do the Mouse LEFT click as default selection click action. Sometimes, the other mouse click action is required. For example, the other hand can move and click the virtual mouse puzzle cell keys. For example, the other hand 82 clicks Double Click 195, then the user moves right hand 77 to control TouchScreen Mouse 224 cursor on a program icon, and push hand out. The GIR program 3 will perform the Double click 195 for that click instead of default Left click. Therefore, the program icon will be double-clicked 195 to open and to run. The other virtual mouse puzzle cell keys are also useful when specific mouse action click needs to be specific. For example, if the user is in view of a large page or a drawing image page, to perform the Left Click Down 192, it will make the whole drawing image page sheet move and follow right hand 77 moving in all directions. When the user moves image sheet to right location, conducts virtual Left Click Down click 194 to release the TouchScreen Mouse 224 Grip action, and back to default. The TouchScreen Mouse 224 can be performed by right hand 77 or left hand 82, and the each hand mouse 224 cursor start position is preferred to be initially on its start location. Because the GIR program vision calibrates the user working space zone 76 into 4 sections, X 218 and Y 216 dimension lines across on virtual center point 79. So, it divides into 4 sections where value of section I, (X+, Y+) 217, section II, (X−, Y+) 215, section III, (X+, Y−) 219, and section IV, (X−, Y−) 220. This means that for the right hand 77, it will determine position using X, Y value of section I, II, III, and IV.

Here are the steps regarding how to control mouse position in each section.

How to obtain current mouse X, Y position on the monitor screen, and to use the value plus Right hand 77 gesture distant X, Y and to multiple the ratio of the screen resolution? This is a direct copy and paste from the GIR working prototype C# program. Copyright. First step is to obtain where is current mouse X, Y position, and then where to move mouse on screen. Recalculate the new position. leftofscreen=mouseScreenSetUpX+(int) mouseSelectHandX*mouseScreenResoultion−RatioX; (Current mouse X position+gesture distant X*screen resolution width ratio) topofscreen=mouseScreenSetUpY+(int) mouseSelectHandY*mouseScreenResoultion−RatioY; (Current mouse Y position+gesture distant Y*screen resolution height ratio). To assign new mouse X, Y value to move the mouse to new position, mouseSeletX=leftofscreen; mouseSeletY=topofscreen. Then the program moves mouse to new position on display monitor. For user to conveniently move the user's hand control mouse point, the Right Hand 77 TouchScreen Mouse 224 program function can be setup to start cursor position and it will be in monitor LEFT-TOP corner position 231 that is video card monitor 0,0 position. On the other hand, for the left hand 82, it will determine position using X 223, Y 229 value between center point 79 of section I, II, III, and IV, then the LEFT Hand TouchScreen Mouse 224 program function can setup to start cursor position in monitor Right-Bottom corner position 227. For example, if a monitor video card uses a resolution as 1900×1200, 228, 230, then the cursor start position is 1900×1200 on the monitor. The GIR program will determine its video view frame width and height ratio to compare with monitor screen resolution ratio, and move mouse cursor distance accordingly with hand in all direction of 360 degrees. TouchScreen Mouse 224 can use gesture click action with computer virtual keyboard keys buttons as well, and to click keys buttons on computer monitor.

Combine Right hand mouse, right hand for moving mouse position with left hand key zone. If Left hand mouse is selected, then Left hand moves mouse position and combine with right hand key selection zone.

If computer windows desktop screen 226 are filled up with click-able buttons on surface, then the user can use TocuhScreen Mouse 224 to select which button to be clicked by gesture action.

The variety of mouse option key selection zone can be coded in this way, this is a direct copy and paste from the GIR working prototype C# program. Copyright.

Example

See code section 3 at the end of specification.

When the user moves mouse to target position, for example, in a web page, then a gesture pushes to click.

In another example, a program icon on the desktop screen, the user uses left hand to click virtual Double click key, and uses right hand to push and click on the program icon to open the program and to run the program.

So, the hand gesture can control Mouse movement, and decide what mouse click action for operating computer, and programs.

In summary of this TouchScreen Mouse combined with Virtual Puzzle Cell keys control panels using sandwich interface layers functions is an advanced gesture system that includes all current computer interface device input methods and becomes one truly universal computer interface device and enables the user to perform gesture control of all machine functions together, and uses easy gesture to control computer, without a need to build physical mouse, keyboard, remote controller, or to build control interface on equipments, machines, robots. The GIR will replace the need for building physical control panels, interface devices, reducing high tech device pollution and saving the material resource usage on the Earth.

Figure 12:
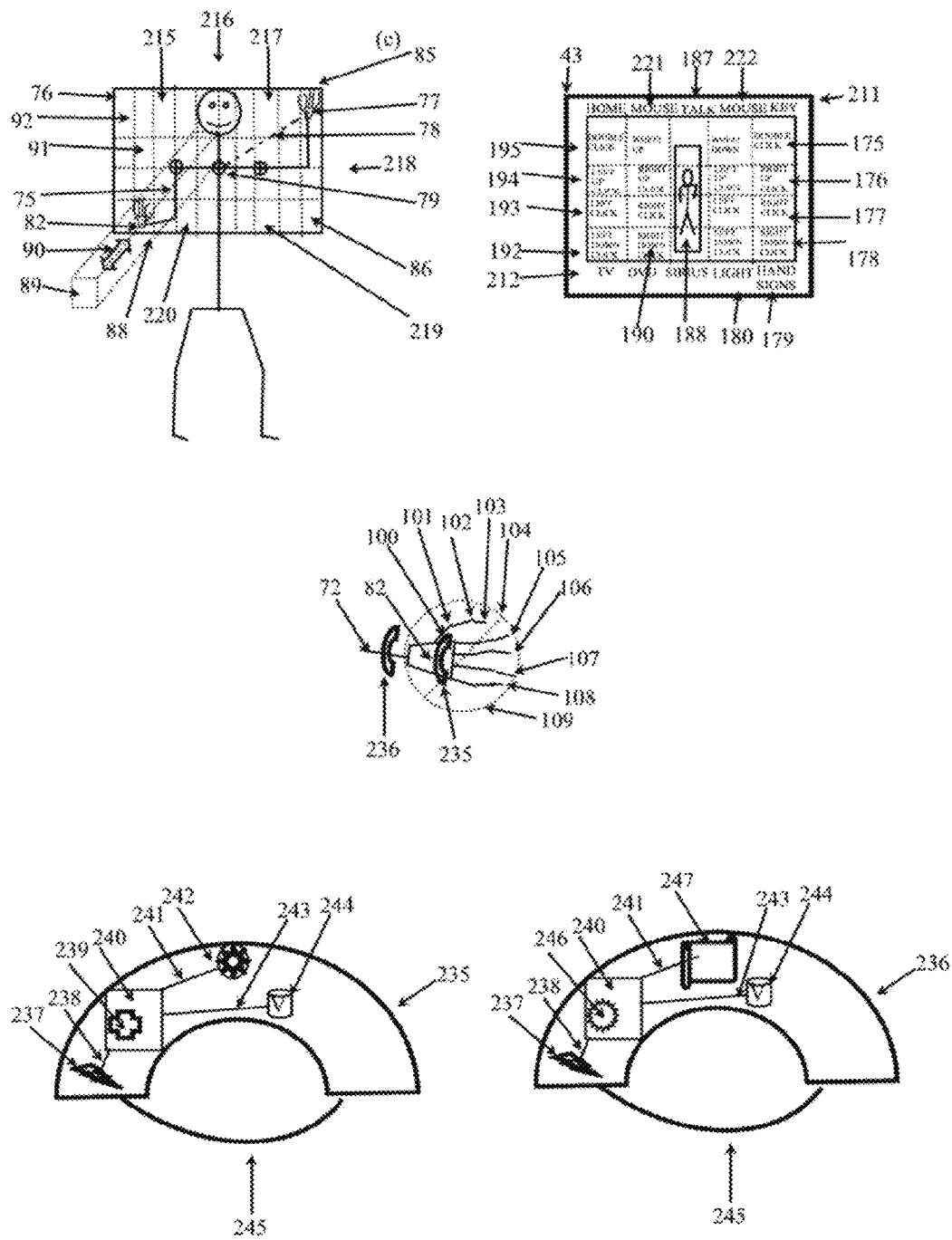
FIG. 12 is a drawing showing the enhanced wireless select key indication device, that is worn on user hand palm, arms, or user body, display which selection keys by blinking LED light in MORSE Code signals, and/or using vibration motor to make long-short vibrations MORSE Code signal. So, the user doesn't need to watch display monitor to know what keys they select. This feature is especially useful for poor eyesight, and blind users.

FIG. 12 is a drawing showing the enhanced wireless select key indication device 235, 236 worn on user hand palm 82, arms, or user body. The wireless indication device has 2 styles. The first style 235 includes micro controller 240, BLUETOOTH 239, LED light 242, vibration motor 244 and power source 237 with flexible belt 245 that can tightly hold on hand palm 82. The $2^{nd}$ style 236 includes micro controller 240, wireless Wi-Fi, TCP/IP network card 246, LCD display screen 247, vibration motor 244, power source 237, watch belt to hold the device on hand 72.

When the user push hand 82 out, the program will send wireless network signals to device and to signal display with selection keys. For example, by blinking LED light 242 in MORSE Code signals, and/or using vibration motor 244 to make long-short vibrations MORSE Code signal, the user doesn't need to watch display monitor 43 to know what keys they select. This feature is especially useful for poor eyesight, and blind users. The LCD screen can display real time monitor content. See the puzzle cell map image.

Figure 13:
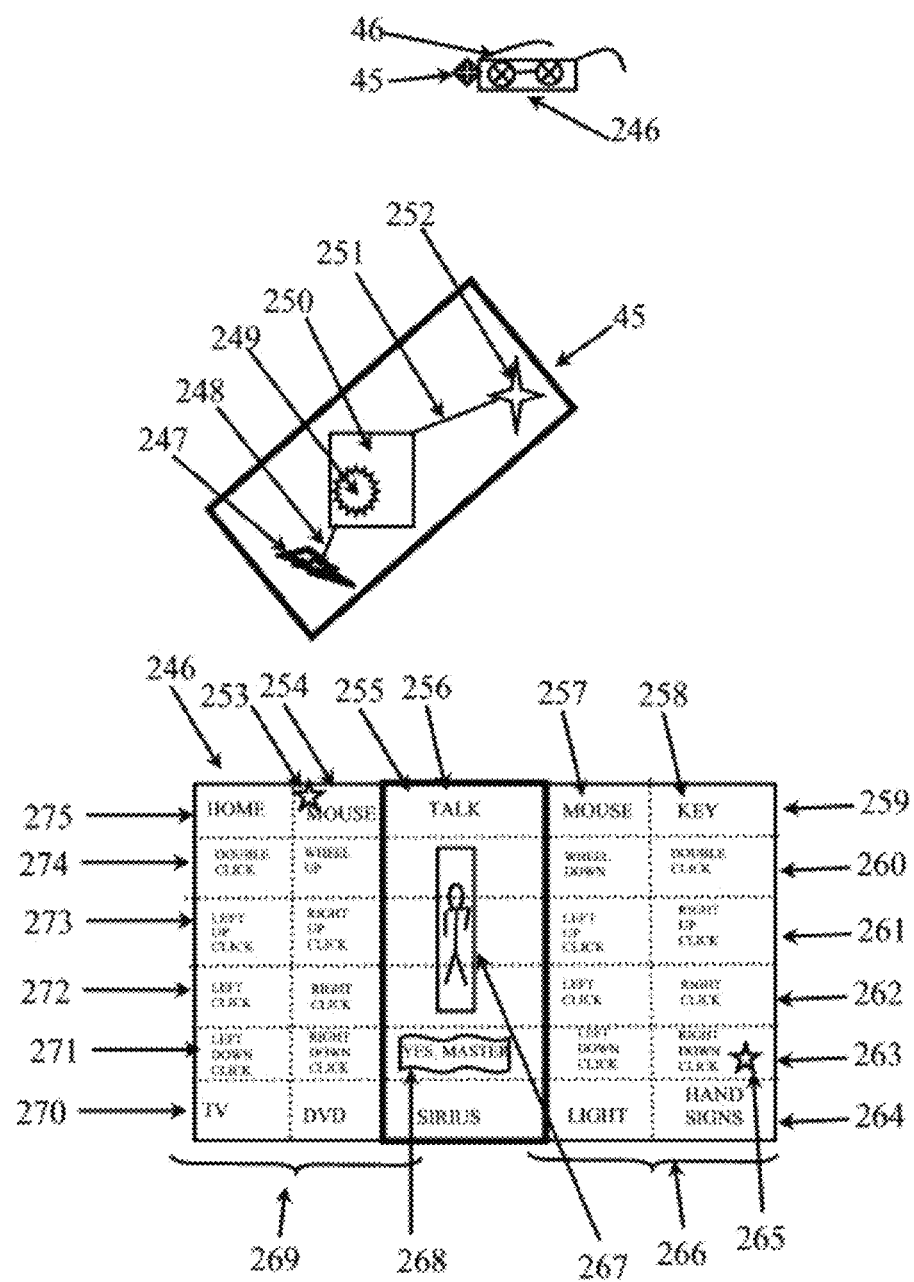
FIG. 13 is the drawing showing a wireless display glass that has network protocol equipment to connect with the GIR. The GIR sends the display puzzle cell map with hands selection position. The wireless display glass projects the puzzle cell image on its lenses. So, the user can see which keys the user select.

FIG. 13 is a drawing showing a wireless display glass 46 that has network protocol equipment 45 including wireless network card equipment 249, video image process card equipment 250, connecting with projector 252, power source 247, and wireless server-client program to connect with the GIR. The GIR sends the display signals of puzzle cell map image with hands selection positions 253, 265. The wireless display glass projector 252 projects the puzzle cell image keys on its lenses 246. So, the user can see which keys they select. The left side 269 area is for left hand keys 270, 271, 272, 273, 274, 275, and the right side 266 area is for the right hand keys 259, 260, 261, 262,263, 264. The lenses center area can be optionally reserved for display the GIR text feedback 268, and real-time video image of user action 267.

Figure 14:
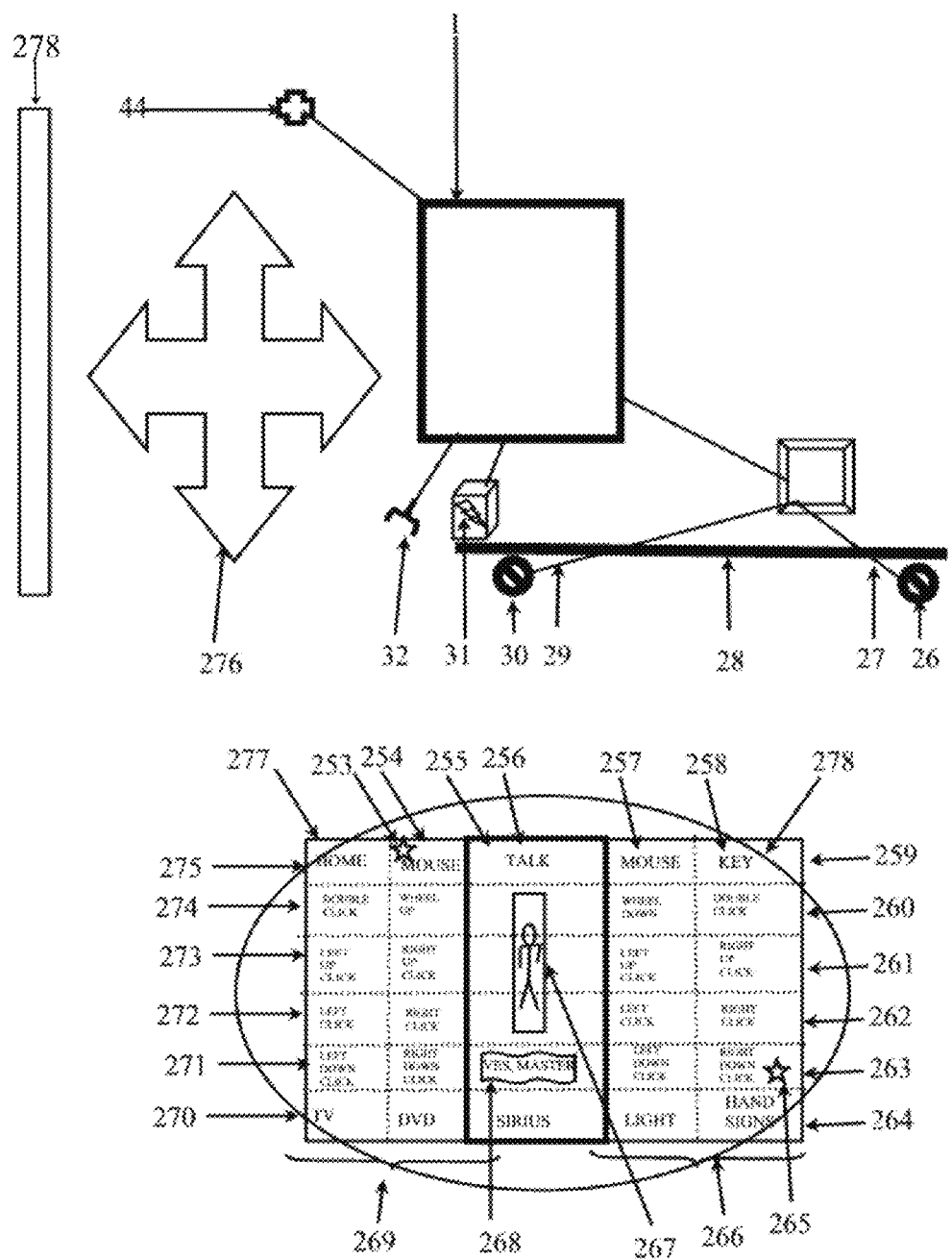
FIG. 14 is a drawing showing that the GIR is equipped with a mobile platform, for example, using micro controller board to control varieties of motors. So, the GIR vision program can intelligently control these motors to rotate. As a result, the GIR intelligently drives itself to move around, and is able to control moving its display projector direction to project puzzle cell keyboard images on any surface. The varieties of motors control modules can be built into the GIR's neck, body, arms, hands, legs, so the GIR can be built as human shape, having physical body movement ability with the GIR puzzle cell map function. The GIR becomes the communication bridge between human and intelligent robot machine world.

FIG. 14 is a drawing showing the GIR being equipped with a mobile platform. For example, the GIR uses micro controller board to control varieties motors 26, 30. So, the GIR main computer 1, vision program can intelligently control rotations of these motors. As a results, the GIR intelligently drives itself to move around 276, and is able to control the movement of its display projector 44 in a direction to project puzzle cell keyboard images 277 on any surface 278.

Here are the Arduino programming code showing how to enable Micro controller to control the motor module rotation.

To control more than 1 motor using 1 string signal array. See code section 4 at the end of specification.

This Arduino can download to Adruino Micro controller and connect the Arduino board COM port to the (PCM-VKCP) program 3. So, the GIR vision program can intelligently send value string to Adruino to rotate its motor direction, speed, intelligently. The motor module can be used for tilting video sensor, and for rotation, and for the GIR body movement, neck, arms, legs, and mobile wheels.

The varieties of motors control modules can be used to build into the GIR's neck, body, arms, hands, legs. So, the GIR can be built as human shape, physical body movement ability with the GIR puzzle cell map function. The GIR becomes the communication bridge between human and intelligent robot machine world.

This invention proposed GIR example is to use MICROSOFT KINECT sensor, MICROSOFT VISUAL STUDIO C# programming, Arduino micro control board as demonstration to build a completed working GIR demonstration. There are alternative methods available to build the GIR as well.

Code section 1:
Copyright.

```
userWorkZoneHead2CenterLength=Math.Sqrt(
Math.Pow(userMeasureCenterPoint.Position.X-
userMeasureHeadPoint.Position.- X, 2)+
Math.Pow(userMeasureCenterPoint.Position.Y-
userMeasureHeadPoint.Position.- Y, 2)+
```

-continued

```
Math.Pow(userMeasureCenterPoint.Position.Z-
userMeasureHeadPoint.Position.- Z, 2));
userWorkZoneCenter2LeftShoulderLength=Math.Sqrt(
Math.Pow(userMeasureCenterPoint.Position.X-
userMeasureLeftEdge.Position.X- , 2)+
Math.Pow(userMeasureCenterPoint.Position.Y-
userMeasureLeftEdge.Position.Y- , 2)+
Math.Pow(userMeasureCenterPoint.Position.Z-
userMeasureLeftEdge.Position.Z- , 2));
userWorkZoneCenter2RightShoulderLength=Math.Sqrt(
Math.Pow(userMeasureCenterPoint.Position.X-
userMeasureRightEdge.Position.- X, 2)+
Math.Pow(userMeasureCenterPoint.Position.Y-
userMeasureRightEdge.Position.- Y, 2)+
Math.Pow(userMeasureCenterPoint.Position.Z-
userMeasureRightEdge.Position.- Z, 2));
```

Code section 2: This is directly copy and paste from robot working prototype C# program. Copyright.

```
puzzleCellMapList[1, 1] = " "; // First row reserve Robot menu
puzzleCellMapList[2, 1] = "MKEY";
puzzleCellMapList[3, 1] = " ";
puzzleCellMapList[4, 1] = " ";
puzzleCellMapList[5, 1] = " ";
puzzleCellMapList[6, 1] = " ";
puzzleCellMapList[7, 1] = " ";
puzzleCellMapList[8, 1] = " ";
puzzleCellMapList[9, 1] = " ";
puzzleCellMapList[10, 1] = " ";
puzzleCellMapList[11, 1] = " ";
puzzleCellMapList[12, 1] = "MKEY";
puzzleCellMapList[13, 1] = " ";
puzzleCellMapList[14, 1] = " ";
puzzleCellMapList[15, 1] = " ";
puzzleCellMapList[16, 1] = " ";
puzzleCellMapList[17, 1] = " ";
puzzleCellMapList[1, 2] = " ";
puzzleCellMapList[2, 2] = "ML315-8"; // Mutiple clicks in 1
puzzleCellMapList[3, 2] = "MU8"; // ReClick able,Large Move
puzzleCellMapList[4, 2] = "MU8"; // Move Mouse Large Up
puzzleCellMapList[5, 2] = "MU8";
puzzleCellMapList[6, 2] = "MR45-8"; //Move 45 Large
puzzleCellMapList[7, 2] = " ";
puzzleCellMapList[8, 2] = " ";
puzzleCellMapList[9, 2] = " ";
puzzleCellMapList[10, 2] = " ";
puzzleCellMapList[11, 2] = " ";
puzzleCellMapList[12, 2] = "ML315-8";// Move Mouse Large 315degree
puzzleCellMapList[13, 2] = "MU8";
puzzleCellMapList[14, 2] = "MU8"; // Move mouse larger Up
puzzleCellMapList[15, 2] = "MU8";
puzzleCellMapList[16, 2] = "MR45-8"; // Move Mouse Large 45 degree
puzzleCellMapList[17, 2] = " ";
puzzleCellMapList[1, 3] = " ";
puzzleCellMapList[2, 3] = "ML8";
puzzleCellMapList[3, 3] = "ML315"; // Move mouse small 315
puzzleCellMapList[4, 3] = "MU"; // Move mouse small Up
puzzleCellMapList[5, 3] = "MR45"; // Move mouse small 45
puzzleCellMapList[6, 3] = "MR8";
puzzleCellMapList[7, 3] = " ";
puzzleCellMapList[8, 3] = " ";
puzzleCellMapList[9, 3] = " ";
puzzleCellMapList[10, 3] = " ";
puzzleCellMapList[11, 3] = " ";
puzzleCellMapList[12, 3] = "ML8";
puzzleCellMapList[13, 3] = "ML315";
puzzleCellMapList[14, 3] = "MU";
puzzleCellMapList[15, 3] = "MR45";
puzzleCellMapList[16, 3] = "MR8";
puzzleCellMapList[17, 3] = " ";
puzzleCellMapList[1, 4] = "ENTER"; //Enter key
puzzleCellMapList[2, 4] = "ML8"; // Move Mouse Large Left
puzzleCellMapList[3, 4] = "ML"; //Move Mouse small Left
puzzleCellMapList[4, 4] = " ";
puzzleCellMapList[5, 4] = "MR"; //Move Mouse small Right
puzzleCellMapList[6, 4] = "MR8"; //Move Mouse Large Right
```

-continued

```
puzzleCellMapList[7, 4] = " ";
puzzleCellMapList[8, 4] = " ";
puzzleCellMapList[9, 4] = " ";
puzzleCellMapList[10, 4] = " ";
puzzleCellMapList[11, 4] = " ";
puzzleCellMapList[12, 4] = "ML8";
puzzleCellMapList[13, 4] = "ML";
puzzleCellMapList[14, 4] = " ";
puzzleCellMapList[15, 4] = "MR";
puzzleCellMapList[16, 4] = "MR8";
puzzleCellMapList[17, 4] = "ENTER";
puzzleCellMapList[1, 5] = " ";
puzzleCellMapList[2, 5] = "ML8";
puzzleCellMapList[3, 5] = "ML225"; //Move Mouse 225 degree
puzzleCellMapList[4, 5] = "MD"; //Move Mouse Down
puzzleCellMapList[5, 5] = "MR135"; //Move Mouse 315 degree
puzzleCellMapList[6, 5] = "MR8";
puzzleCellMapList[7, 5] = " ";
puzzleCellMapList[8, 5] = " ";
puzzleCellMapList[9, 5] = " ";
puzzleCellMapList[10, 5] = " ";
puzzleCellMapList[11, 5] = " ";
puzzleCellMapList[12, 5] = "ML8";
puzzleCellMapList[13, 5] = "ML225";
puzzleCellMapList[14, 5] = "MD";
puzzleCellMapList[15, 5] = "MR135";
puzzleCellMapList[16, 5] = "MR8";
puzzleCellMapList[17, 5] = " ";
puzzleCellMapList[1, 6] = " ";
puzzleCellMapList[2, 6] = "ML225-8"; //Move Mouse 225 Multiple
puzzleCellMapList[3, 6] = "MD8"; //Move Mouse Large Down
puzzleCellMapList[4, 6] = "MD8";
puzzleCellMapList[5, 6] = "MD8";
puzzleCellMapList[6, 6] = "MR135-8"; //Move mouse 135 Mutiple
puzzleCellMapList[7, 6] = " ";
puzzleCellMapList[8, 6] = " ";
puzzleCellMapList[9, 6] = " ";
puzzleCellMapList[10, 6] = " ";
puzzleCellMapList[11, 6] = " ";
puzzleCellMapList[12, 6] = "ML225-8";
puzzleCellMapList[13, 6] = "MD8";
puzzleCellMapList[14, 6] = "MD8";
puzzleCellMapList[15, 6] = "MD8";
puzzleCellMapList[16, 6] = "MR135-8";
puzzleCellMapList[17, 6] = " ";
puzzleCellMapList[1, 7] = "QWERT"; // Last Row reserved controls
puzzleCellMapList[2, 7] = "DCLICK";// Mouse Double Click
puzzleCellMapList[3, 7] = "LCLICK";// Mouse Left Click
puzzleCellMapList[4, 7] = "WWT"; // change to WWT control
puzzleCellMapList[5, 7] = "SLOT";// change to SLOT control
puzzleCellMapList[6, 7] = "DJING"; // change to DJING control
puzzleCellMapList[7, 7] = " ";
puzzleCellMapList[8, 7] = " ";
puzzleCellMapList[9, 7] = " ";
puzzleCellMapList[10, 7] = " ";
puzzleCellMapList[11, 7] = " ";
puzzleCellMapList[12, 7] = "DCLICK";
puzzleCellMapList[13, 7] = "LCLICK";
puzzleCellMapList[14, 7] = "RCLICK";
puzzleCellMapList[15, 7] = "2NDLIFE"; // change to 2ndLife control
puzzleCellMapList[16, 7] = "ROVER"; // change to ROVER control
puzzleCellMapList[17, 7] = " "; } // MKEY
```

Code section 3:

```
if (mouseClickTypeSelection == 0)
{
    DoMouseClick( ); //default Left Mouse click
}
else if (mouseClickTypeSelection == 1)
{
    DoMouseLeftClickUp( ); // if Key Left Up select
}
else if (mouseClickTypeSelection == 2)
{
    DoMouseDoubleClick( ); // if Key Double click select
}
else if (mouseClickTypeSelection == 3)
{
    DoMouseLeftClickDown( ); // if Key Left Down select
}
else if (mouseClickTypeSelection == 4)
{
    DoMouseRightClickUp( ); // if Key Right Up select
}
else if (mouseClickTypeSelection == 5)
{
    DoMouseRightClick( );// if Key Right Click select
}
else if (mouseClickTypeSelection == 6)
{
    DoMouseRightClickDown( );// if Key Right Down select
}
```

Code section 4: Directly copy and paste from robot working prototype in Arduino code. Copyright

```
#include <Servo.h>
Servo servo;
Servo servoY;
void setup( ) {
    servo.attach(11); // digital pin 11
    servoY.attach(10); // digital pin 10
    Serial.begin(9600);
    servo.write(90);
    servoY.write(90);
}
void loop( )
{
    if (Serial.available( ) >=2 )
    {
        byte pos= Serial.read( );
        byte posXY= Serial.read( );
        if(pos == 1)
        {
            servo.write(posXY);
            delay(5);
        }
        else if (pos ==2)
        {
            servoY.write(posXY); delay(5);
        }
    }
}
```

The invention claimed is:

1. A gesture interface robot (GIR) comprising
a platform having wheels;
a main computer;
a video vision sensor module to sense gestures of a user;
a universal infrared receiver transmitter;
a micro controller board;
a puzzle cell map virtual keyboard control program (PCMVKCP);
a plurality of motor modules controllable by the micro controller board; and
one or more display monitors or projectors;
wherein the main computer, the video vision sensor module, the universal infrared receiver transmitter, the micro controller board, the plurality of motor modules and the one or more display monitors or projectors are attached to the platform;
wherein the PCMVKCP divides an three-dimensional virtual workspace zone into a puzzle cell row-column formation;
wherein the PCMVKCP divides the three-dimensional virtual workspace zone into a first, second and third selectable gate zones along a direction perpendicular to a surface of the puzzle cell row-column formation wherein the first selectable gate zone is to unlock a selected key gate zone;

wherein the second selectable gate zone is to select a virtual key zone; and wherein the third selectable gate zone is to click a selected zone.

2. The GIR of claim 1 further comprising a portable power source selected from the group consisting of a rechargeable battery, a solar cell, a fuel cell, a rotation generator, a wind turbine and a thermo electron generator.

3. The GIR of claim 1, wherein a puzzle cell virtual keyboard in the three-dimensional virtual workspace zone is presented to the user and wherein a motion of a hand and fingers of the user selecting a selected key of the puzzle cell virtual keyboard is captured by the video vision sensor module.

4. The GIR of claim 3 further comprising a plurality of pre-recorded macro scripts, wherein the GIR executes a selected pre-recorded macro script of the plurality of pre-recorded macro scripts corresponding to the selected key of the puzzle cell virtual keyboard to send infrared signals, Bluetooth signals or WiFi signals to remotely control a computer, a machine, an intelligent robot, an auto self driving car, a flight jet, a spaceship, a radio, a disco light, a Morse keyboard, a telescope, a television, a digital video disk, a mouse or an internet browser.

5. The GIR of claim 1, wherein the main computer includes a web server function so as to control a computer, a machine, an intelligent robot, an auto self driving car, a flight jet, a spaceship, a radio, a disco light, a Morse keyboard, a telescope, a television, a digital video disk, a mouse or an internet browser through an automation program.

6. The GIR of claim 1, wherein the PCMVKCP determines a center, a width and a length of the three-dimensional virtual workspace zone and the PCMVKCP activates a selected motor module of the plurality of motor modules to rotate the video vision sensor module when the user walks out of a video viewable area.

7. The GIR of claim 1, wherein the GIR defines a hand gesture to move fingers of the user to change a selection of a selected puzzle cell.

8. The GIR of claim 7, wherein the defined hand gesture improves a control accuracy of the selection of the selected puzzle cell.

9. The GIR of claim 1, wherein a virtual puzzle cell map keys control panel graphic image is drawn on the one or more display monitors or projectors; wherein the virtual puzzle cell map keys control panel graphic image is divided into a left, a center and a right zones and wherein a real time video image of the user is displayed in the center zone of the virtual puzzle cell map keys control panel graphic image.

10. The GIR of claim 1, wherein the GIR accepts voice commands to rotate a selected motor module of the plurality of motor modules.

11. The GIR of claim 1, wherein the GIR displays a virtual touch screen.

12. The GIR of claim 1 further comprising a wireless key-indication device configured to be worn on a palm, an arm or a body of the user.

13. The GIR of claim 1, wherein the GIR is of a human shape; wherein the GIR moves from a first location to a second location by the wheels; and wherein a surface of the one or more display monitors or projectors is changed from a first predetermined direction to a second predetermined direction.

14. The GIR of claim 1 further comprising a wireless display glass projector to project key information of a puzzle cell image on lenses.

15. The GIR of claim 1 further comprising a visual image projector; wherein the GIR moves the one or more display monitors or projectors or the visual image projector along a predetermined direction; and wherein the one or more display monitors or projectors or the visual image projector displays letters a to z, numbers 0 to 9, symbols, function keys, open computer programs, Media, a running DVD player, a playing music, a video, an internet browser, playing games, or computer functions.

16. The GIR of claim 1, wherein the GIR sends an enter key command directly to an activation program.

17. The GIR of claim 1, wherein the GIR activates a virtual touch screen mouse function and wherein the GIR disables a right-hand selection function and enables a left-hand selection function.

18. The GIR of claim 1, wherein the GIR calculates a ratio of X, Y distance between virtual center points and applies the ratio to move a mouse cursor position.

19. The GIR of claim 1, wherein the GIR recognizes a gesture of pushing out a hand of the user as to perform a click action.

20. The GIR of claim 1 further comprising at least one network equipment.

21. The GIR of claim 1 further comprising a speech recognition program function and an array of microphones.

22. The GIR of claim 1, wherein the micro controller board includes sensor modules and the micro controller board sends signals to the main computer.

23. The GIR of claim 1, wherein the three-dimensional virtual workspace zone includes a touchscreen mouse having sandwich layers functions.

24. A gesture interface robot (GIR) comprising
a main computer;
a video vision sensor module to sense gestures of a user;
one or more display monitors or projectors; and
a puzzle cell map virtual keyboard control program (PCMVKCP);
wherein the PCMVKCP divides a three-dimensional virtual workspace zone into a puzzle cell row-column formation;
wherein the PCMVKCP divides a space of the three-dimensional virtual workspace zone into selectable sandwich layer work zones along a direction perpendicular to a surface of the puzzle cell row-column formation; and
wherein the three-dimensional virtual workspace zone includes a touchscreen mouse having sandwich layers functions.

25. The GIR of claim 24, wherein the GIR allows automatic measurement of the three-dimensional virtual workspace zone of the user, assigns a virtual center point, creates the three-dimensional virtual workspace zone in a conformable area, establishes puzzle cell mapping keys, and presents virtually controlling panel in front of the user to be clicked.

26. The GIR of claim 24, wherein the video vision sensor module is configured to detect three-dimensional positional values of joints of the user and the GIR provides real-time tracking of locations of hands of the user.

27. The GIR of claim 24, wherein the GIR uses a relative distant on hand locations to a center point to determine X, Y position of a puzzle cell position and wherein the GIR recognizes user push hand locations in Z direction.

28. The GIR of claim 24, wherein the PCMVKCP divides the three-dimensional virtual workspace zone into a first, second and third selectable gate zones along a direction perpendicular to a surface of the puzzle cell row-column formation
wherein the first selectable gate zone is to unlock a selected key gate zone;
wherein the second selectable gate zone is to select a virtual key zone; and
wherein the third selectable gate zone is to click a selected zone.

29. The GIR of claim 24, wherein the GIR divides the three-dimensional virtual workspace zone into four sections including section I of (X+, Y+), section II of (X−, Y+), section III of (X+, Y−), and section IV of (X−, Y−) and wherein the section I and the section III are operable by a right hand of the user and wherein the section II and the section IV are operable by a left hand of the user.

30. The GIR of claim 24, wherein the GIR detects a hand of the user moving up, down, left, right, push and pull.

31. The GIR of claim 24, wherein the GIR calculates a ratio of X, Y distance between virtual center points and applies the ratio to move a mouse cursor position.

32. The GIR of claim 24, wherein an initial cursor position is at an upper left corner or at a lower right corner of a virtual touch screen.

33. The GIR of claim 24, wherein the GIR recognizes a gesture of pushing out a hand of the user as to perform a click action.

34. The GIR of claim 24, wherein the GIR recognizes a gesture to control a lock or an unlock action.

35. The GIR of claim 24, wherein the GIR defines a gesture enhancing selection control accuracy.

36. The GIR of claim 24, wherein the GIR defines a hand gesture for a touchscreen mouse grip function.

37. The GIR of claim 24, wherein the touchscreen mouse is combined with a virtual puzzle cell keys control panel using the sandwich layers functions.

38. The GIR of claim 24, wherein the GIR supports a gesture action of the touchscreen mouse combining the sandwich layers functions with virtual control panel keys zone functions.

39. The GIR of claim 24, wherein each hand and fingers gestures and position values on each video frame is compared and distinguished by a respective hand sign on a puzzle cell area.

40. The GIR of claim 24, wherein the GIR tracks X, Y values of hands of the user and tracks Z values between a body of the user and the hands of the user.

41. The GIR of claim 24, wherein the GIR activates a virtual touch screen mouse function and wherein the GIR disables a right-hand selection function and enables a left-hand selection function.

42. The GIR of claim 24, wherein the GIR supports a hand sign language function.

43. A gesture interface robot (GIR) comprising
a main computer;
a video vision sensor module to sense gestures of a user;
one or more display monitors or projectors; and
a puzzle cell map virtual keyboard control program (PC-MVKCP);
wherein the PCMVKCP divides a three-dimensional virtual workspace zone into a puzzle cell row-column formation;
wherein the PCMVKCP divides a space of the three-dimensional virtual workspace zone into a first, second and third selectable gate zones along a direction perpendicular to a surface of the puzzle cell row-column formation;
wherein the video vision sensor module includes a vision sensor, an RGB video camera, a web camera or a video sensor camera equipped with an infrared emitter and an infrared signal reflection detect sensor;
wherein the first selectable gate zone is to unlock a selected key gate zone;
wherein the second selectable gate zone is to select a virtual key zone; and
wherein the third selectable gate zone is to click a selected zone.

44. The GIR of claim 43, wherein the GIR allows automatic measurement of the three-dimensional virtual workspace zone of the user, assigns a virtual center point, creates the three-dimensional virtual workspace zone in a conformable area, establishes puzzle cell mapping keys, and presents virtually controlling panel in front of the user to be clicked.

45. The GIR of claim 44, wherein said creating the three-dimensional virtual workspace zone in the conformable area is to establish a three-dimensional workspace, establish a width of the three-dimensional virtual workspace zone being a pre-determined times of a sum of two shoulder widths of the user and to establish a length of the three-dimensional virtual workspace zone being a function of a length of an arm of the user and wherein a direction of the length is along an arm pushing out direction of the user.

46. The GIR of claim 43, wherein a puzzle cell size is calculated by a workspace zone size divided by a number of rows and a number of columns.

47. The GIR of claim 43, wherein the GIR divides the three-dimensional virtual workspace zone into four sections including section I of (X+, Y+), section II of (X−, Y+), section III of (X+, Y−), and section IV of (X−, Y−).

48. The GIR of claim 43, wherein the GIR detects a hand of the user moving up, down, left and right, push and pull.

49. The GIR of claim 43, wherein the GIR uses a puzzle cell mapping gesture command method and the user extends a user's hand forward to confirm a selection.

50. The GIR of claim 43, wherein the GIR uses a relative distant on hand locations to a center point to determine X, Y position of a puzzle cell position and wherein the GIR recognizes user push hand locations in Z direction.

51. The GIR of claim 43, wherein the puzzle cell row-column formation includes a keyboard.

52. The GIR of claim 43, wherein the video vision sensor module is configured to detect three-dimensional positional values of joints of the user and the GIR provides real-time tracking of locations of hands of the user.

53. The GIR of claim 52, wherein a virtual puzzle cell map keys control panel graphic image is drawn on the one or more display monitors or projectors; wherein the virtual puzzle cell map keys control panel graphic image is divided into a left, a center and a right zones and wherein a real time video image of the user is displayed in the center zone of the virtual puzzle cell map keys control panel graphic image.

54. The GIR of claim 43, wherein values read by the video vision sensor module are available for the PCMVKCP to use them.

55. The GIR of claim 43, wherein the GIR detects motions of fingers of the user.

56. The GIR of claim 43, wherein the GIR defines a gesture enhancing selection control accuracy.

57. The GIR of claim 43, wherein the GIR defines a hand gesture to move fingers of the user to change a selection of a selected puzzle cell.

58. The GIR of claim 43, wherein the GIR detects a continuously click virtual key without pull a hand of the user back.

59. The GIR of claim 43, wherein the three-dimensional virtual workspace zone includes a touchscreen mouse having sandwich layers functions.

60. The GIR of claim 43, wherein the GIR recognizes a gesture of pushing out a hand of the user as to perform a click action.

61. The GIR of claim 43, wherein the GIR determines a first ratio of a first width to a first height of a video view frame; wherein the GIR compares the first ratio with a second ratio of a second width to a second height of a monitor screen; and the GIR moves a mouse cursor by a distance based on the comparison of the first ratio with the second ratio.

62. The GIR of claim 43, wherein the three-dimensional virtual workspace zone includes a touchscreen mouse having sandwich layers functions and wherein the puzzle cell row-column formation includes a keyboard.

63. The GIR of claim 43, wherein the puzzle cell row-column formation includes a keyboard and wherein the GIR supports a hand sign language function.

64. The GIR of claim 43, wherein each hand and fingers gestures and position values on each video frame is compared and distinguished by a respective hand sign on a puzzle cell area.

65. The GIR of claim 43, wherein the GIR supports a hand sign language function.

66. The GIR of claim 43, wherein the three-dimensional virtual workspace zone includes a touchscreen mouse having sandwich layers functions and wherein the GIR supports a hand sign language function.

67. The GIR of claim 43, wherein the three-dimensional virtual workspace zone includes a touchscreen mouse having sandwich layers functions; wherein the GIR supports a hand sign language function; and wherein the puzzle cell row-column formation includes a keyboard.

68. The GIR of claim 43, wherein the GIR recognizes a pointer stick configured to be held by a mouth of the user.

69. The GIR of claim 43, wherein the GIR sends an enter key command directly to an activation program.

70. The GIR of claim 43, further comprising a plurality of pre-recorded macro scripts, wherein the GIR executes a selected pre-recorded macro script of the plurality of pre-recorded macro scripts corresponding to the selected key of the puzzle cell virtual keyboard to send infrared signals, Bluetooth signals or WiFi signals to remotely control a computer, a machine, an intelligent robot, an auto self driving car, a flight jet, a spaceship, a radio, a disco light, a morse keyboard, a telescope, a television, a digital video disk, a mouse or an internet browser.

71. The GIR of claim 43, wherein the main computer includes a web server function so as to control a computer, a machine, an intelligent robot, an auto self driving car, a flight jet, a spaceship, a radio, a disco light, a morse keyboard, a telescope, a television, a digital video disk, a mouse or an internet browser through an automation program.

72. The GIR of claim 43 further comprising a universal infrared receiver transmitter.

73. The GIR of claim 43 further comprising at least one network equipment.

74. The GIR of claim 43, wherein the one or more display monitors or projectors or a visual image projector displays letters a to z, numbers 0 to 9, symbols, function keys, open computer programs, Media, a running DVD player, a playing music, a video, an internet browser, playing games, or computer functions.

75. The GIR of claim 43 further comprising a speech recognition program function and an array of microphones.

76. The GIR of claim 43, wherein the GIR is equipped with voice speaking program function.

77. The GIR of claim 43 further comprising a wireless key-indication device configured to be worn on a palm, an arm or a body of the user.

78. The GIR of claim 43 further comprising a wireless display glass.

79. The GIR of claim 43 further comprising a micro controller board, wherein the micro controller board includes sensor modules and the micro controller board sends signals to the main computer.

80. The GIR of claim 43, wherein the GIR includes a virtual mouse, a keyboard, control panels, a computer interface method, a touchscreen mouse, virtual puzzle cell mouse keys, a virtual control panel keyboard, a mouse key controller or a hand sign language function.

81. The GIR of claim 43, wherein the GIR uses a computer interface method to remotely control a computer, a machine, an intelligent robot, an auto self driving car, a flight jet, a spaceship, a radio, a disco light, a morse keyboard, a telescope, a television, a digital video disk, a mouse or an internet browser.

82. The GIR of claim 43 further comprising a micro controller board, wherein the micro controller board includes sensor modules and the micro controller board sends signals to the main computer and wherein controls rotations of a plurality of motors through the micro controller board.

83. The GIR of claim 43, wherein the GIR tracks X, Y values of hands of the user and tracks Z values between a body of the user and the hands of the user.

84. A gesture interface robot (GIR) comprising
a platform having wheels;
a main computer;
a video vision sensor module to sense gestures of a user;
a universal infrared receiver transmitter;
a micro controller board;
a wireless display glass projector to project key information of a puzzle cell image on lenses;
a plurality of motor modules controllable by the micro controller board; and
a display monitor;
wherein the main computer, the video vision sensor module, the universal infrared receiver transmitter, the micro controller board, the plurality of motor modules and the display monitor are attached to the platform.

85. The GIR of claim 84 further comprising a three-dimensional virtual workspace zone, wherein a puzzle cell virtual keyboard in the three-dimensional virtual workspace zone is presented to the user and wherein a motion of a hand and fingers of the user selecting a selected key of the puzzle cell virtual keyboard is captured by the video vision sensor module.

86. The GIR of claim 84, wherein the GIR includes a virtual mouse, a keyboard, control panels, a computer interface method, a touchscreen mouse, virtual puzzle cell mouse keys, a virtual control panel keyboard, a mouse key controller or a hand sign language function.

87. The GIR of claim 84, wherein the GIR further comprises a puzzle cell map virtual keyboard control program (PCMVKCP);

wherein the PCMVKCP divides an virtual workspace zone into a puzzle cell row-column formation;

wherein the PCMVKCP divides the virtual workspace zone into a first, second and third selectable gate zones along a direction perpendicular to a surface of the puzzle cell row-column formation wherein the first selectable gate zone is to unlock a selected key gate zone;

wherein the second selectable gate zone is to select a virtual key zone; and wherein the third selectable gate zone is to click a selected zone.

88. The GIR of claim 84 further comprising a three-dimensional virtual workspace zone, wherein the three-dimensional virtual workspace zone includes a touchscreen mouse having sandwich layers functions.

\* \* \* \* \*

UNITED STATES PATENT AND TRADEMARK OFFICE
CERTIFICATE OF CORRECTION

PATENT NO. : 9,696,813 B2
APPLICATION NO. : 14/723435
DATED : July 4, 2017
INVENTOR(S) : Hsien-Hsiang Chiu It is certified that error appears in the above-identified patent and that said Letters Patent is hereby corrected as shown below:

On the Title Page

"(74) Attorney, Agent or Firm - Chen-Chi Li" should be replaced by --(74) Attorney, Agent or Firm - Chen-Chi Lin--.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*